US006583528B2

(12) United States Patent
Gabrys

(10) Patent No.: US 6,583,528 B2
(45) Date of Patent: Jun. 24, 2003

(54) HIGH PERFORMANCE COMPOSITE FLYWHEEL

(75) Inventor: Christopher W. Gabrys, Federal Way, WA (US)

(73) Assignee: Indigo Energy, Inc., Napa, CA (US)

( * ) Notice: Subject to any disclaimer, the term of this patent is extended or adjusted under 35 U.S.C. 154(b) by 8 days.

(21) Appl. No.: 09/864,413

(22) Filed: May 23, 2001

(65) Prior Publication Data

US 2001/0054856 A1 Dec. 27, 2001

Related U.S. Application Data

(60) Provisional application No. 60/241,404, filed on Oct. 18, 2000, and provisional application No. 60/212,291, filed on Jun. 19, 2000.

(51) Int. Cl.$^7$ ............................................... H02K 7/02
(52) U.S. Cl. ........................ 310/74; 74/572; 523/468; 528/120; 528/122; 528/123
(58) Field of Search ..................... 310/74; 523/468; 528/120, 122, 123; 74/572

(56) References Cited

U.S. PATENT DOCUMENTS 4,285,251 A       8/1981   Swartout
4,366,108 A   *  12/1982   Urech et al. ................. 264/137

(List continued on next page.)

OTHER PUBLICATIONS

Gabrys, C.W. and Bakis, C.E. "Design and Testing of Composite Flywheel Rotors" Composite Materials: Testing and Design, 13$^{th}$ vol., STP 1242, S.J. Hooper, Ed., American Society for Testing and Materials, Conshohocken, PA, 1997, pp. 3–22.

(List continued on next page.)

Primary Examiner—Burton S. Mullins
(74) Attorney, Agent, or Firm—J. Michael Neary

(57) ABSTRACT

A flywheel system for storing and delivering on demand electrical energy includes a flywheel supported for high speed rotation on bearings in a vacuum enclosure, and a motor-generator for spinning the flywheel up to speed and then for converting the rotational inertia in the flywheel back to electrical power. The flywheel includes a solid steel hub and a rim having only two rings press-fit on the hub with an interference fit. The rings are filament wound construction made primarily from standard modulus carbon fiber/epoxy. The steel hub stores between 40% and 60% of the energy in the flywheel. The press-fitting of the rings on the hub creates radial interference pressure between the hub and each of the composite rings that is greater than 5 ksi when at rest. The outer carbon fiber/epoxy ring is radially thinner than the inner ring, and both the hub outer diameter and the inner diameter of the assembled composite rim are tapered with the same angle. The inner composite ring and the inner diameter of the outer ring are also tapered with a matching taper. The ratio of steel hub mean diameter to flywheel outer diameter is between 0.50 and 0.70, and the ratio of inner carbon fiber/epoxy ring mean outer diameter to flywheel outer diameter is between 0.80 and 0.90. An epoxy resin is used for the manufacture of composite flywheels that is comprised primarily of Bisphenol A epoxy and a mixture of curing agents comprised between 20 and 70% of cycloaliphatic amine by weight. The remainder of the curing agent mixture is comprised primarily of an aliphatic amine or ether amine.

28 Claims, 25 Drawing Sheets

U.S. PATENT DOCUMENTS

| | | | | | |
|---|---|---|---|---|---|
| 4,393,180 A | * | 7/1983 | Andrews | ............... | 525/504 |
| 4,860,611 A | | 8/1989 | Flanagan et al. | | |
| 4,996,016 A | | 2/1991 | Walls et al. | | |
| 5,285,699 A | | 2/1994 | Walls et al. | | |
| 5,477,092 A | | 12/1995 | Tarrant | | |
| 5,546,648 A | | 8/1996 | Tarrant | | |
| 5,566,588 A | | 10/1996 | Bakholdin et al. | | |
| 5,591,812 A | * | 1/1997 | Starner | ............... | 525/526 |
| 5,628,232 A | | 5/1997 | Bakholdin et al. | | |
| 6,138,527 A | * | 10/2000 | Bitterly et al. | ............... | 74/572 |
| 6,410,127 B1 | * | 6/2002 | Kamae et al. | ............... | 428/297.4 |

OTHER PUBLICATIONS

Gabrys, C.W. and Bakis, C.E. "Fabrication of Thick Filament Wound Carbon Epoxy Rings Using in–situ Curing: Manufacturing and Quality" Proc. American Society for Composites, $9^{th}$ Technical Conf., Technomic, Lancaster, PA, 1994, pp. 1090–1097.

Gabrys, C.W. and Bakis, C.E. "Filament Winding of Thick Composite Rings with High Radial Accretion Rates" Proc. Intl. Expo '98, Soc. Patics Industry, New York, 1998, pp. 17.1–1–17A.8.

* cited by examiner

Types of Epoxy Curing Agents and Cured Resin Properties

|  | Curing Agent Viscosity (cps) | Typical Tg (°C) | Gel Temp (2 hr gel) (°C) | Typical Elongation (%) | Toughness |
|---|---|---|---|---|---|
| Amidoamines | 200 | 50 | 30 | 7 | Very Tough |
| Polyamides | 1000 | 60 | 30 | 4 | Tough |
| Aliphatic Amines | 20 | 80 | 60 | 4 | Tough |
| Ether Amines | 70 | 80 | 60 | 4 | Tough |
| Aromatic Amines | 150 | 160 | 110 | 4 | Brittle |
| Ketimines | 5 | - | - | - | - |
| Anhydrides | 150 | 130 | 80 | 1 | Very Brittle |
| Imidazoles | Powder | - | - | - | - |
| Cycloaliphatic Amines | 50 | 150 | 50 | 4 | Brittle |

Fig. 22

HIGH PERFORMANCE COMPOSITE FLYWHEEL

This application claims benefit of No. 60/212,291 filed Jun. 19, 2000 which claims benefit of No. 60/241,404 filed Oct. 18, 2000.

This invention pertains to high performance composite flywheels, and more particularly a flywheel with a rim and integral hub for a high speed, large energy storage flywheel energy storage system with significantly reduced costs. The flywheel includes a two ring, standard modulus carbon fiber rim that is press-fit together and pressed over a tapered solid steel hub. The flywheel rim rings are filament wound carbon fiber in an epoxy resin matrix that allows increased operating temperature and radial strength of the rims with simultaneous manufacturing ease and use of low cost constituent materials.

BACKGROUND OF THE INVENTION

Modern flywheel energy storage systems convert back and forth between a spinning flywheel's rotational energy and electrical energy. A flywheel energy storage system includes a flywheel, a motor/generator, a bearing system and a vacuum enclosure. The rotating flywheel stores the energy mechanically; the motor/generator converts energy between electrical and mechanical, and the bearing system physically supports the rotating flywheel. High-speed flywheels are normally contained in a vacuum or low pressure enclosure to minimize aerodynamic losses that would occur from operation in the atmosphere, while low speed systems can be operated at atmosphere.

Several types of flywheel designs are used for energy storage; they can be classified into three groups based on their design attributes: low performance industrial, high performance industrial and aerospace. Low performance industrial flywheels are normally constructed of steel and all the energy stored in the flywheel is stored in the rotational inertia of the low cost spinning steel flywheel. The performance of existing steel flywheels in terms of tip speed and energy per unit weight is low, primarily because they are generally limited to tip speeds around 200 m/sec or less. However, the advantages of low performance industrial (steel) flywheels are that they are relatively simple and low cost.

The second group of energy storage flywheels, high performance industrial, uses composite materials for increased flywheel performance. Filament wound glass fibers in conjunction with low cost standard modulus carbon fibers in an epoxy matrix are typically used to form the energy storage rim. The flywheels are typically designed so that the rim stores most of the flywheel's energy, usually more than 90%. Therefore, the goal of designers has been to minimize the cost of the rim by using the lowest cost materials and manufacturing techniques for construction of the rim. However, the use of the lowest cost fibers for the rim results in an undesirable attribute: a rim with significant radial growth when spun to high speed. The large growth is due to the lower elastic modulus of the low cost fibers. For example, glass fiber has an elastic modulus of about 10–13 million pounds/square inch (msi) compared to the elastic modulus of standard modulus carbon fiber of about 30–39 msi. A lightweight hub is used to couple the rim to the shaft. The hub must be designed to match the substantial growth of the inner periphery of the low cost composite rim, so that the rim will not grow radially away from and become separated from the hub, but instead remain connected to the hub at high speed. Most flywheel designs use machined aluminum hubs and less frequently hubs made from composite materials. Some hubs contain thin bending elements that allow the hub to grow with the rim. Metallic hubs are typically made from aluminum instead of steel because of the higher coefficient of thermal expansion. This higher coefficient of thermal expansion facilitates shrink fit installation of the hub and allows for approximately twice as much precompression of the hub so that it can follow the large rim growth at high speed. In some designs, the space available inside the flywheel rim inner diameter can be used for integral placement of the motor/generator or bearing system.

The design goal for high performance industrial flywheels is improvement over the performance of steel flywheels while maintaining relatively low cost. These high performance flywheels have higher tip speeds than the old low performance industrial flywheels, ranging from 500 to 1000 m/sec. The benefits of this higher rotation speed capability include storage of more energy, reduced bearing loads due to lighter flywheel weight, and the use of smaller or more powerful motor/generators due to the higher operating frequency.

Aerospace flywheels are designed for use in satellites and other space applications including space station power storage. The high launch costs for lifting objects into space make the design goals of this group of flywheels unique compared with industrial flywheels. The relative importance of the cost of the actual flywheel is insignificant compared to its performance, that is, the energy to weight and energy to size ratios. These flywheels are constructed of mostly if not all composite materials. Designs however focus on using the highest strength, more expensive intermediate modulus carbon fibers (40–50 msi). In many cases, the designs also concentrate most of the material comprising the flywheel to close to the outer diameter. This increases the inertia and energy storage of the flywheel while minimizing its weight. A radially preloaded press-fit construction in conjunction with use of the highest strength carbon fibers further allows for higher tip speeds, usually over 1000 m/sec, hence more energy storage per unit weight. Hubs, if metallic, are made small to reduce the flywheel weight. Flywheels used for defense applications such as mobile rail gun compulsators have many of the same or similar design and cost objectives and should be included in the aerospace category.

Of the composite material flywheels, various designs have been proposed and constructed, dating back to the 1970's. Many designs for these high-speed energy storage flywheels included filament wound composite rings which are made of either glass and or carbon fibers in an epoxy matrix. These rings are usually wound with the fibers in the hoop direction and sometimes with a small amount of axial direction reinforcement added. Radial direction fibers are not added with filament winding. Such filament wound rings have the inherent advantage of very high hoop direction strengths, which are needed to match the very high hoop stresses generated during rotation. One drawback to the use of hoop wound composite rings for the rim portion of a high-speed flywheel is the inherently low radial tensile strength resulting from the absence of fiber reinforcement in that direction. It is therefore desirable to construct flywheels that operate in radial compression instead of radial tension. Because the radial direction stresses in a rotating filament wound ring are controlled by the non-dimensionalized radial thickness of the ring (ratio of ID to OD), such rings must be made radially thin to reduce the radial tensile stresses generated. Because a single ring must be made very thin (ratio of ID to OD≈0.8) so that it does not fail at a prematurely low rotational speed, the ring becomes less effective for energy storage.

To increase the effective ring thickness and hence the energy storage capacity of composite rims, a common approach for high performance industrial flywheels is to construct the rim of several different material rings. The rim is designed with the material having the lowest ratio of elastic modulus to density (hereinafter referred to as "specific stiffness") at the inner diameter. This is usually glass fibers. The material used in the rim rings surrounding the inner ring is progressively higher specific stiffness materials (usually standard modulus carbon fibers) toward the outer diameter. Materials with higher specific stiffness will grow less than materials with lower specific stiffness when subjected to high-speed rotation. Therefore, the hybrid material composite rim with radially graduated specific stiffness precludes generation of unacceptable radial tensile stresses during rotation because the inner ring or rings grows into the outer ring or rings. In many cases, the thick rim actually goes into self-generated radial compression when spun, thereby allowing safe and reliable operation.

To take advantage of the self-generated radial compression of the multiple fiber rim design, the rim is constructed using lower modulus fibers at its inner diameter. This usually means that the rim inner diameter is made of glass fibers that have a lower modulus than all carbon fibers. Using standard modulus carbon fibers instead for the inner diameter rim using intermediate modulus and high modulus carbon fibers in the outer rims is considered to be an undesirable design approach because of the very high cost and lower strength of high modulus carbon fibers. Using glass fibers for the rim inner diameter allows the inner ring to grow sufficiently to allow self-generated radial compression. However, using glass fibers in the flywheel rim increases the difficulty of maintaining secure connection of the rim to the hub at high rotation speeds. The inner diameter growth of such rims becomes large at high speed, making design of hubs that remain connected to the rim difficult. To match the high radial growth of the rim, hubs are commonly machined out to produce spokes or curved bending elements to allow the hub to grow radially with the rim. Significant machining of the hub along with the using of aluminum for the hub material for added shrink-fit precompression inherently reduces the weight and hence the energy stored by the hub in high performance industrial flywheels and increases the cost.

Aerospace flywheels achieve both higher rotation speeds and energy per unit weight than high performance industrial flywheels by using more costly construction. Instead of using single wound multiple material composite rings for self-generated radial compression, aerospace flywheels typically achieve radial compression solely through precompression or interference assembly. All of the rings are typically constructed of high strength carbon fiber. By assembling the rings together with a radial interference between each ring, the rings can be fully driven into radial compression at zero speed. When the rotor is spun to high speed, the radial compression between the rings lessens. At failure speed, the pressure between two or more rings goes into tension and the rings can separate.

Interference fits can be created three ways: thermal shrink fits, high-pressure resin injection and press-fits. Thermally shrink-fitting a smaller ring inside a larger one can be done for light interference fits. However, because the composite rings are anisotropic in nature, unacceptable internal stresses can be generated when rings undergo large changes in temperature. The low coefficients of thermal expansion of the carbon fiber rings also further reduces the level of interference that can be achieved with this method. The use of high-pressure resin injection method preloads the composite rings by the addition of a bonding agent. The bonding agent is injected in the radial gap between concentric rings at high pressure and is then cured in place. Although this method has been shown capable of generating large radial precompression, it is only typically used for very long rotors where the tooling and process complexity are justified. For these reasons, aerospace flywheels generally use press-fit construction to achieve radial precompression.

Press-fit assemblies produce radial precompression by having composite rings with tapered inner and outer diameter surfaces. The inner ring has a mean outer diameter that is larger than the mean inner diameter of the outer ring. The rings initially slide telescopically together some amount, usually more than 50% together. A large hydraulic press is then used to axially force the rings all the way together, completing the assembly and driving the rings into radial compression. Epoxy is applied to the sliding surfaces prior to press-fitting to serve as both a lubricant aiding in the sliding and also as a bonding agent to keep the rings together after assembly. Because the flywheel rim is used almost exclusively for the energy storage, the rim is typically constructed of between 3 to 10 rings for sufficient storage and to allow the denser hub to be made adequately small and lightweight. More expensive, high strength intermediate modulus carbon fibers are used in the outer rings of the rim to further maximize the aerospace flywheels' performance.

In addition to the actual fibers used and overall flywheel construction technique chosen, the resin used to manufacture a composite flywheel is equally important. The resin system must have adequate temperature capability, high toughness and strength, and properties conducive to low cost, high speed manufacturing, all with low material costs itself Many resin types currently exist and have been used for manufacture of composite materials. Each has advantages and disadvantages but none to date has been shown have favorable attributes in all the areas required for manufacturing of low cost, high performance commercial flywheels.

SUMMARY OF THE INVENTION

The disclosed invention is a value-optimized flywheel having a unique combination of flywheel elements elements to achieve a new, significantly lower cost, high performance flywheel. The invention uses a solid steel flywheel hub and a flywheel rim made of two rings press-fit together and pressed onto the hub. The two rings are made of standard modulus carbon fiber wound in an epoxy matrix. The invention uses a cost integrated design approach, considering the cost per unit energy storage of the hub and rim combination. Instead of focusing solely on the cost of the rim, the flywheel cost per unit energy storage capacity is considered for the flywheel as a whole. A complete fully stressed low cost solid steel flywheel hub is combined with a more expensive all carbon fiber press-fit rim such that the hub and the rim each store roughly equal amounts of energy. The new combination inherently allows for the lowest cost high performance composite flywheel by allowing simultaneous efficient stress loading and energy storage of each part of the flywheel. The energy stored in the flywheel with the carbon fiber rim is more than double the energy stored in the steel flywheel hub alone, and the use of the solid steel hub significantly reduces the cost per energy of the high-speed composite flywheel. The resulting flywheel can operate at tip speeds of at least 700 m/sec.

The hub, because it is solid, can operate at both its maximum allowable radial and hoop direction tensile stresses, and each of the two standard modulus carbon fiber rings operates near their maximum allowable hoop stresses. A solid hub, besides storing significant energy, generates equal radial and hoop stresses, whereas a machined hub would significantly increase one of these stresses depending on the design. This allows a solid hub to be made larger. The solid hub also significantly reduces machining costs over conventional flywheel hubs. The radial stresses in the composite rings are kept in compression throughout the entire speed range through the use of the press-fit. By using only carbon fiber and avoiding the use of glass fiber in the rim, the higher elastic, modulus of the all-carbon fiber rim limits growth at high speed so that the rim and hub stay connected at high rotation speeds. By employing the maximum allowable radial interference pressures between the two rings and the inner ring and hub (roughly 15 ksi for hoop wound composite rims), the use of only standard modulus carbon fiber is adequate to keep both the rings in radial compression and connected to the hub at high speed. The installation of the hub by press-fitting instead of a thermal shrink fit permits much higher initial interference between the hub and rim, allowing the rim and hub to stay connected at high speed. The composite rim is more expensive than conventional high performance flywheel rims because of the use of more standard modulus carbon fiber instead of glass fibers (Standard Modulus carbon fiber costs about five to ten times more than the cost of E-glass fiber by weight.). However, because the steel hub, costing about the same as E-glass by weight, is also used for energy storage, the total cost per energy is less. At the same time, the performance of the invention is equally high, with a tip speed over 700 m/sec.

The new composite flywheel rims are manufactured with a new resin and curing agent mixture that facilitates construction of flywheels is described. Flywheels in accordance with this invention can be manufactured with the new resin mixture with the highest speed capability while having adequate temperature stability, easy manufacturing, low residual stresses and low costs. Because the properties of resins usually involve tradeoffs, the resin mixture invention is optimized for the unique requirements specific for flywheels and their manufacture to achieve a unique balance of properties.

DESCRIPTION OF THE DRAWINGS

This invention and its many attendant advantages will become more clear upon reading the following description of the preferred embodiments in conjunction with the following drawings, wherein:

FIG. 22 is a chart of several types of curing agents and cured resin properties;

DESCRIPTION OF THE PREFERRED EMBODIMENT

Figure 1:
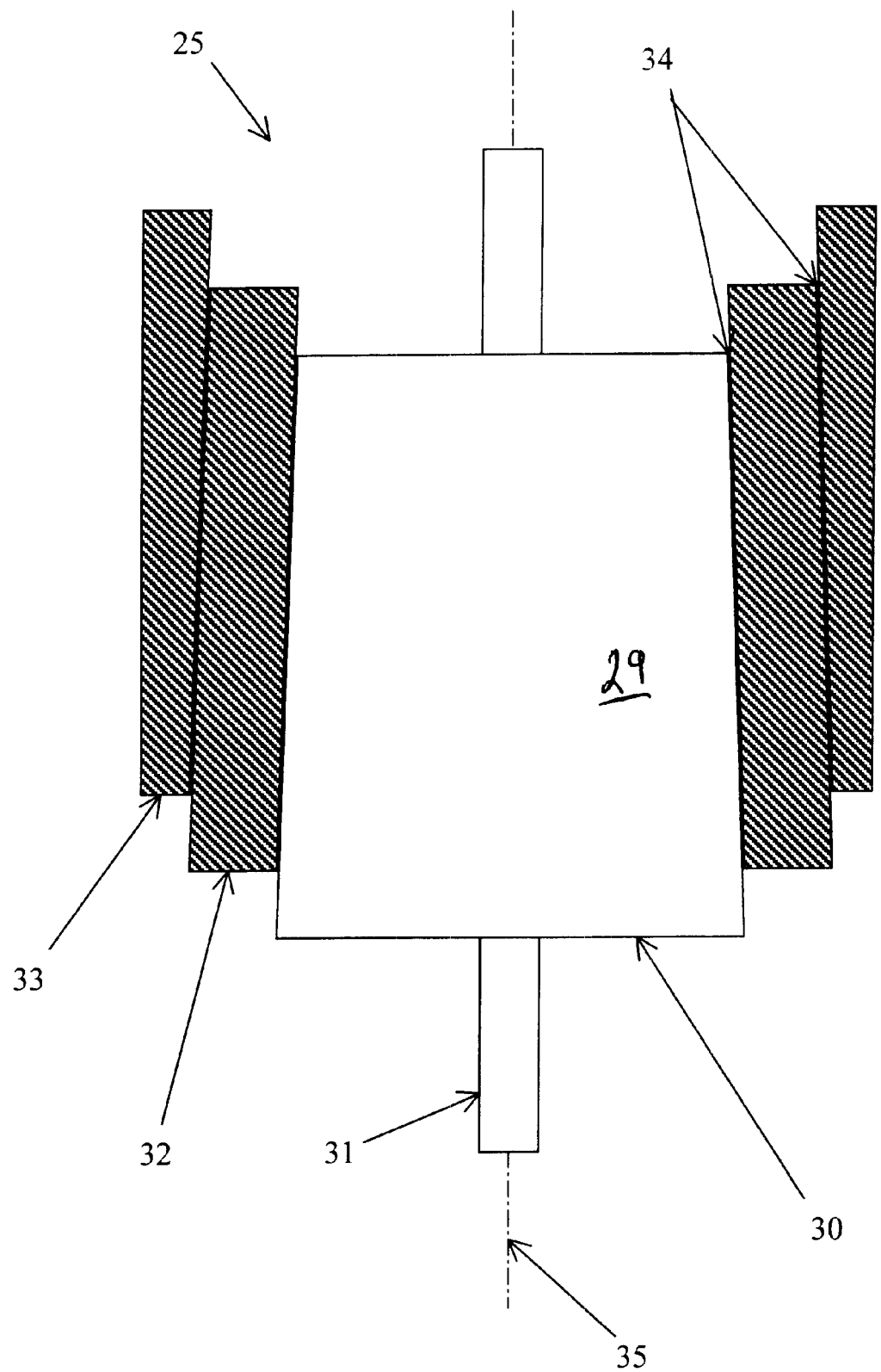
FIG. 1 is a schematic sectional elevation of a partially assembled flywheel in accordance with this invention.
Figure 2:
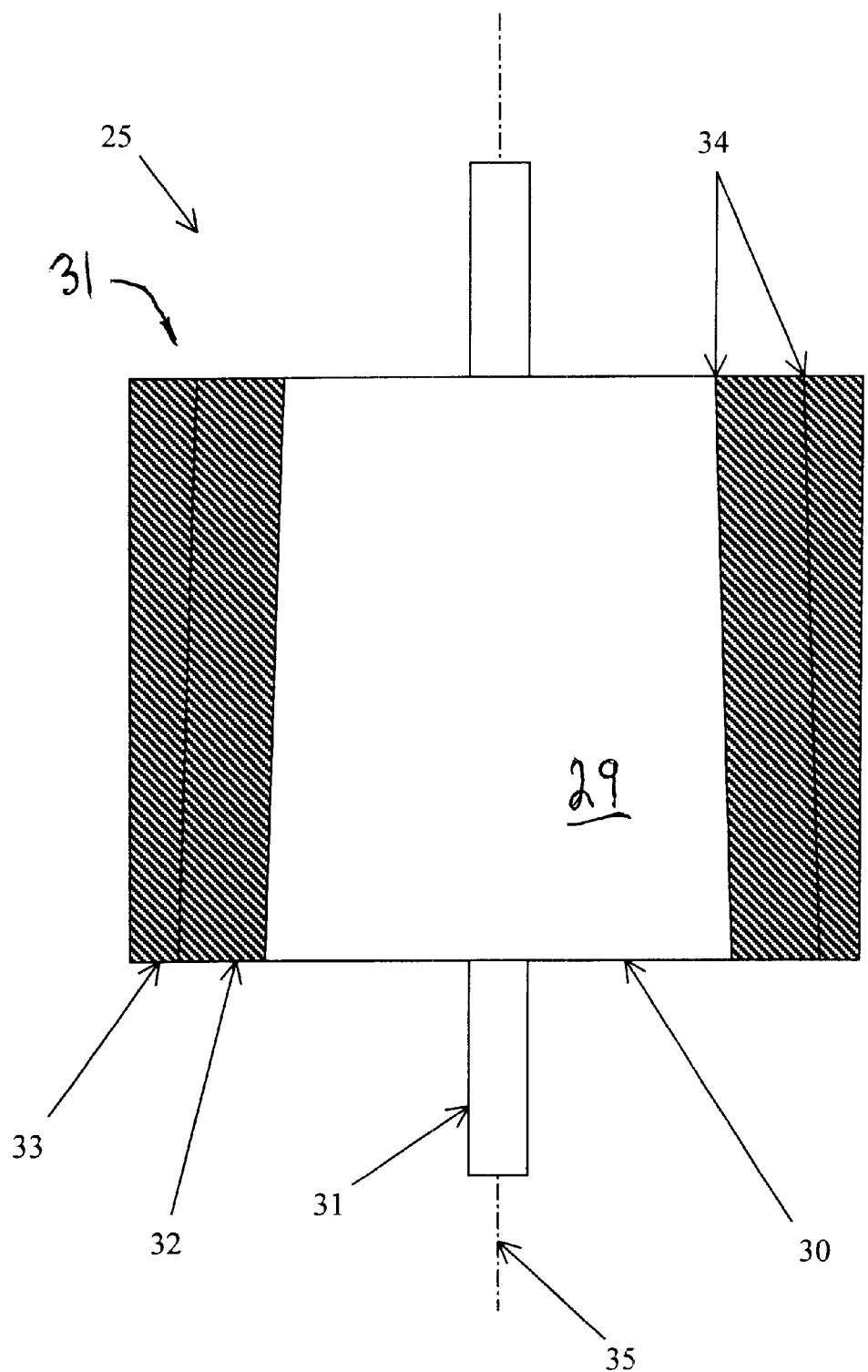
FIG. 2 is a schematic sectional elevation of a flywheel in accordance with this invention after assembly of the flywheel rims on the hub.
Figure 3:
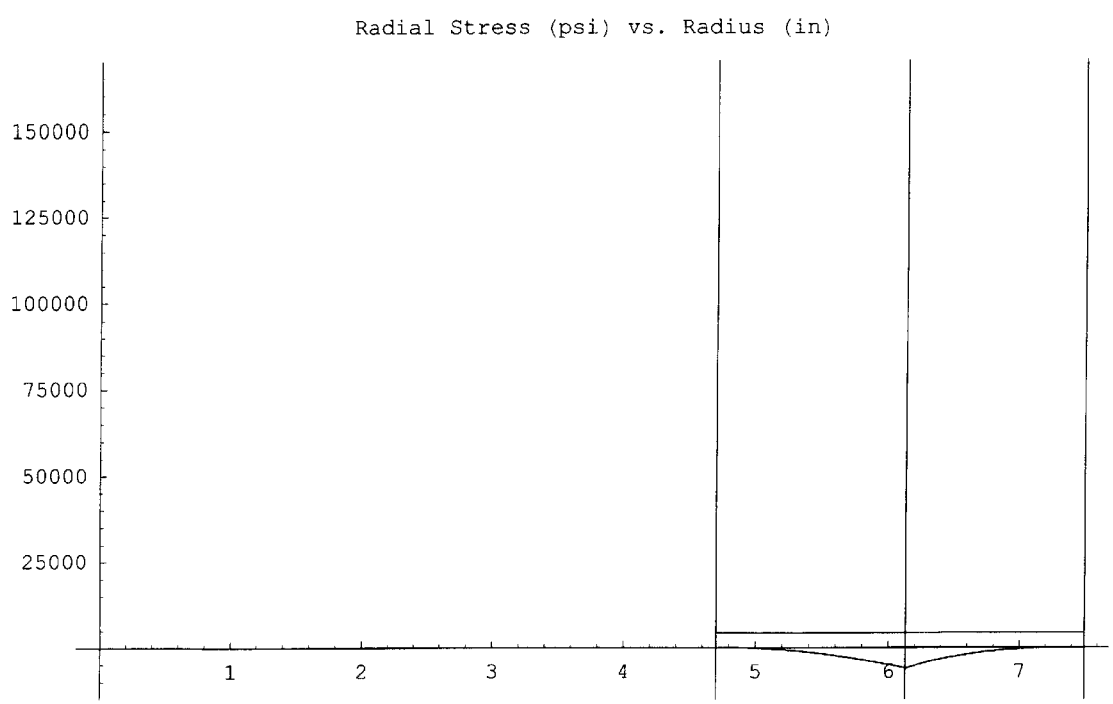
FIGS. 3 and 4 are radial and hoop stress plots, respectively, of a typical high performance industrial flywheel constructed of E-glass/epoxy and standard modulus carbon fiber/epoxy while operating at 35,000 rpm (35 krpm)
Figure 4:
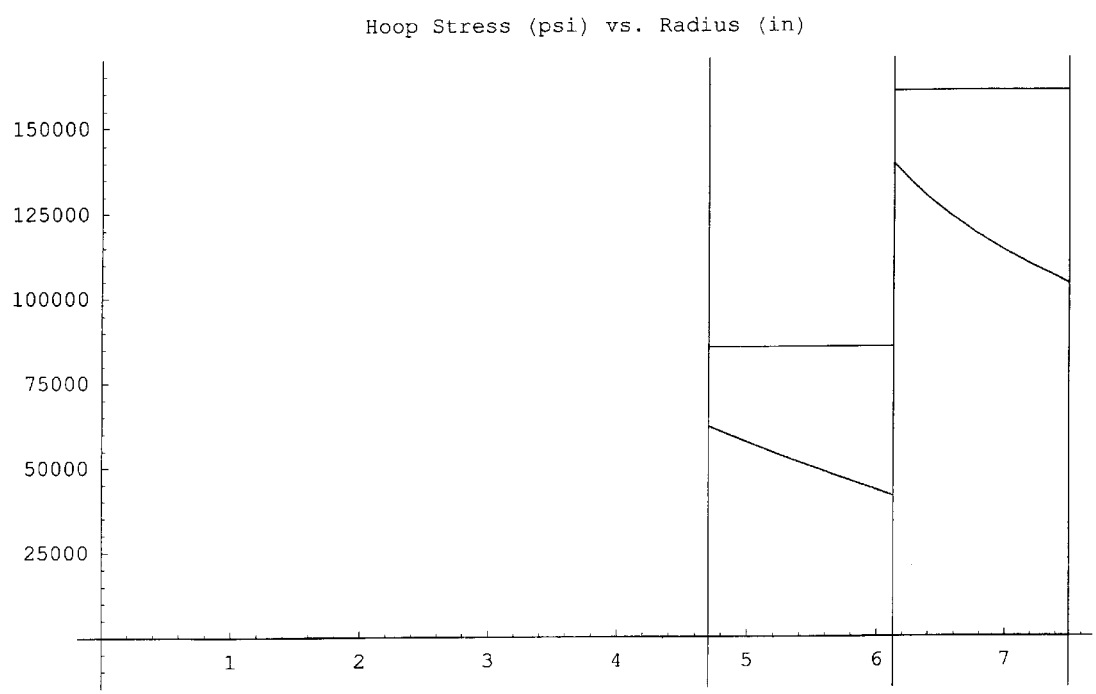
Figure 5:
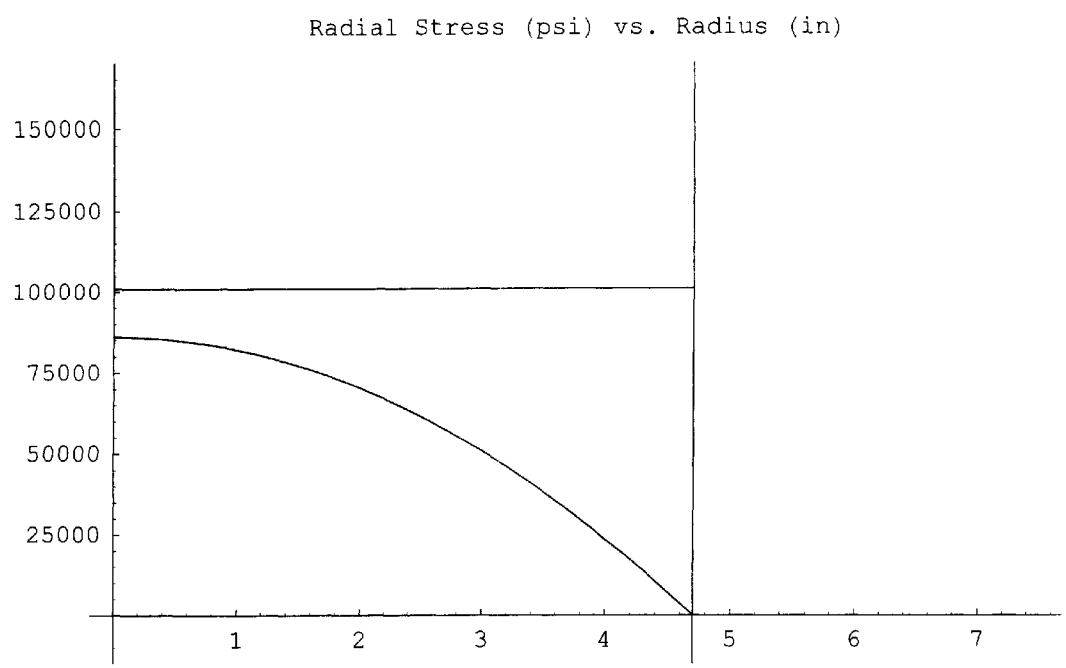
FIGS. 5 and 6 are radial and hoop stress plots, respectively, of a steel flywheel hub while operating at 35 krpm.
Figure 6:
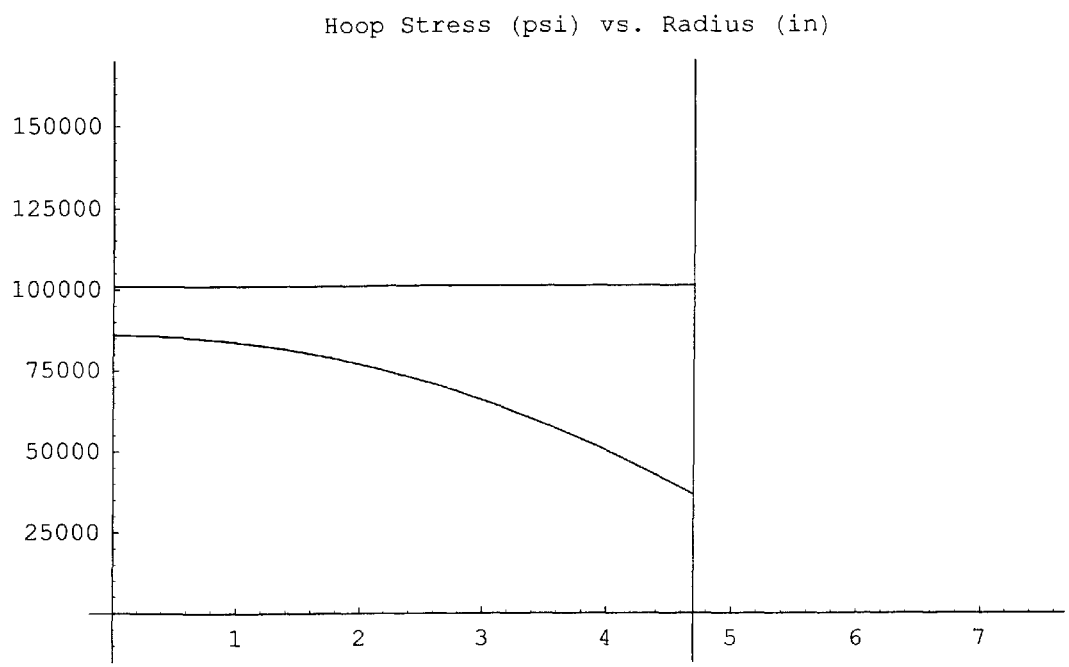
Figure 7:
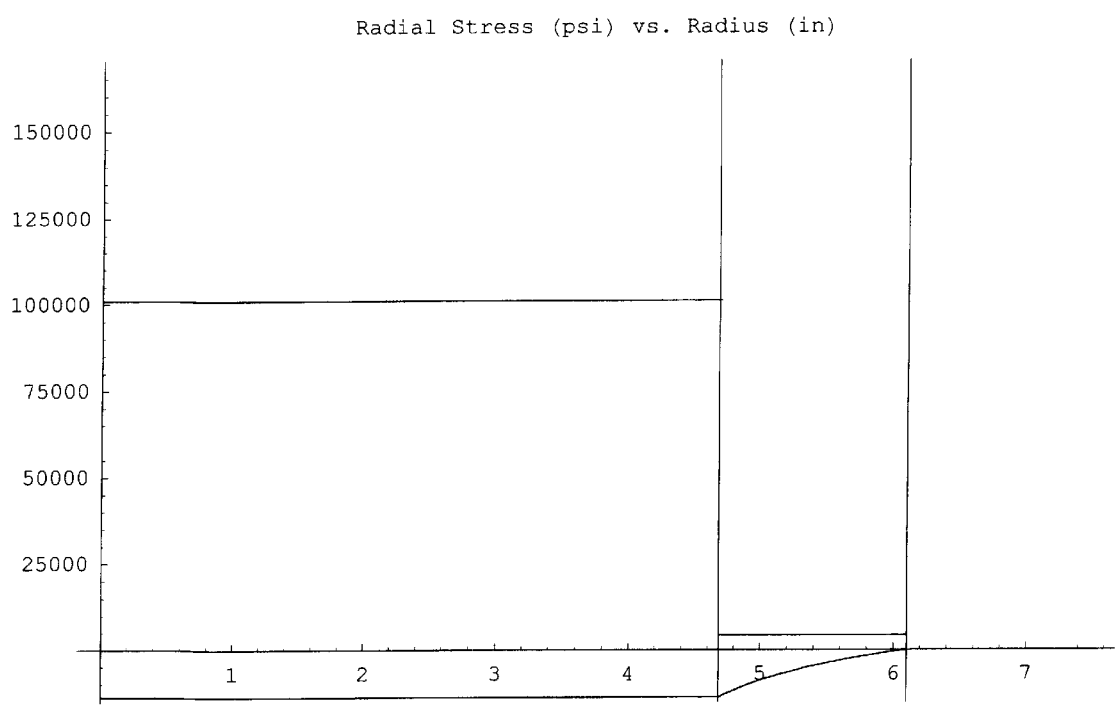
FIGS. 7 and 8 are radial and hoop stress plots, respectively, of a flywheel at rest constructed of a single standard modulus carbon fiber/epoxy ring and a solid steel hub.
Figure 8:
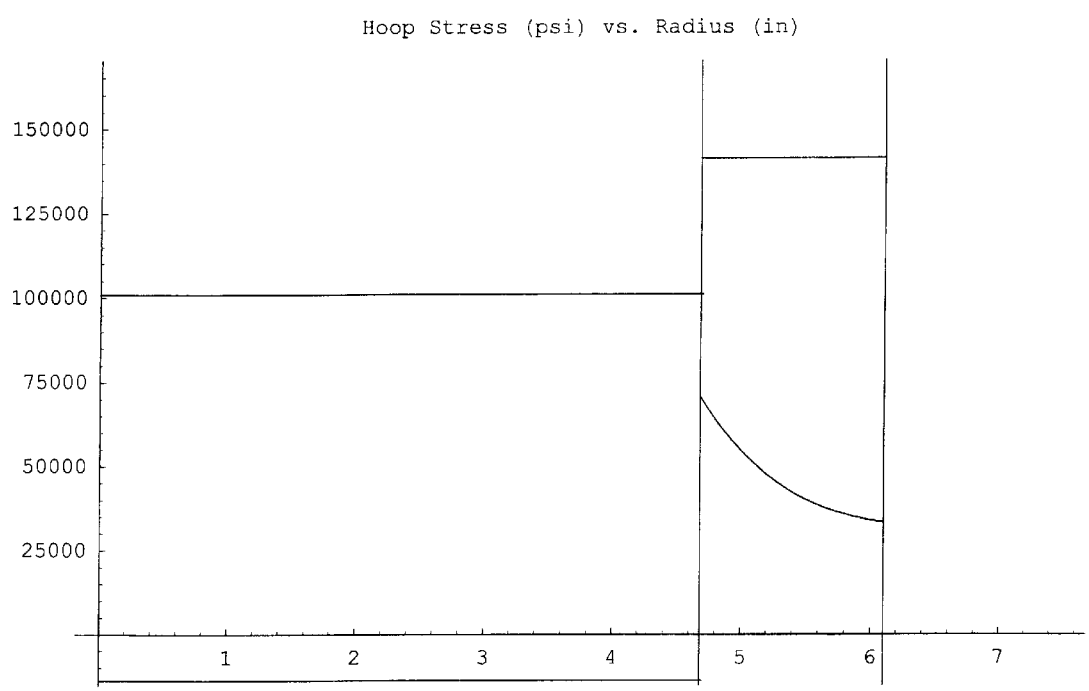
Figure 9:
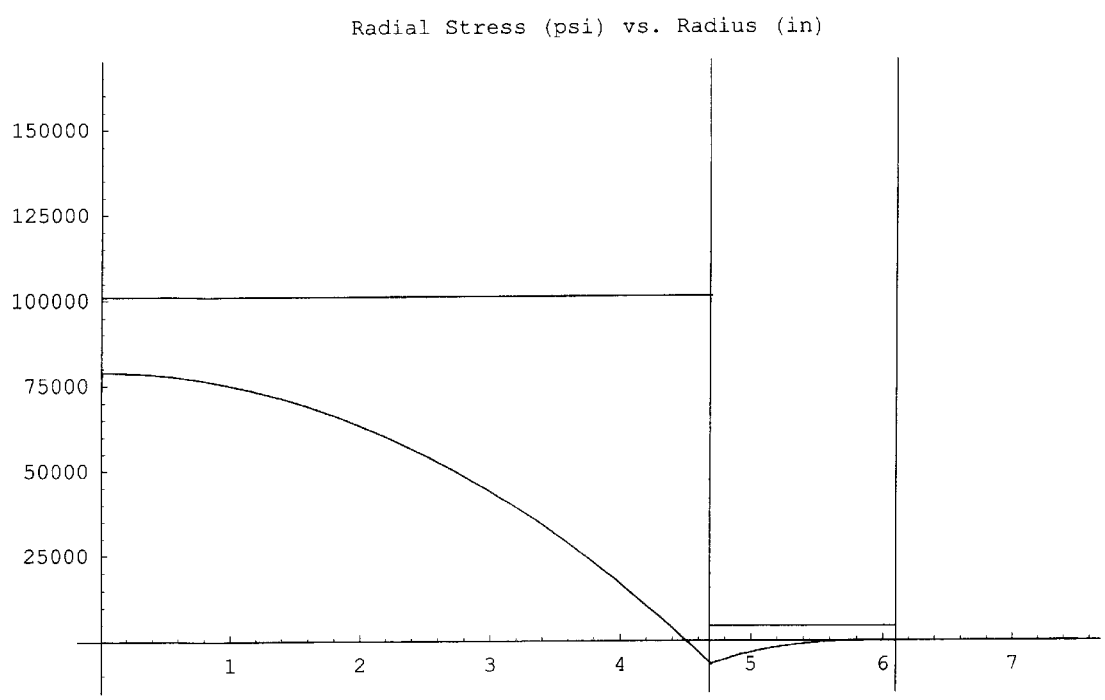
FIGS. 9 and 10 are radial and hoop stress plots, respectively, of a flywheel depicted in FIGS. 7 and 8 while operating at 35 krpm.
Figure 10:
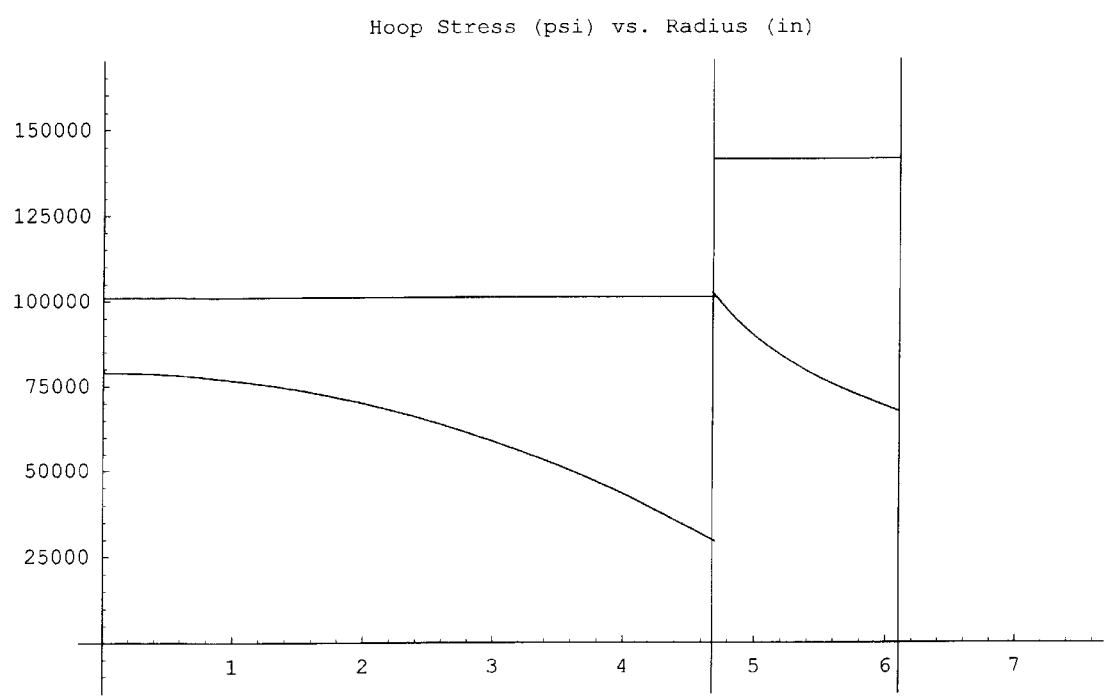
Figure 11:
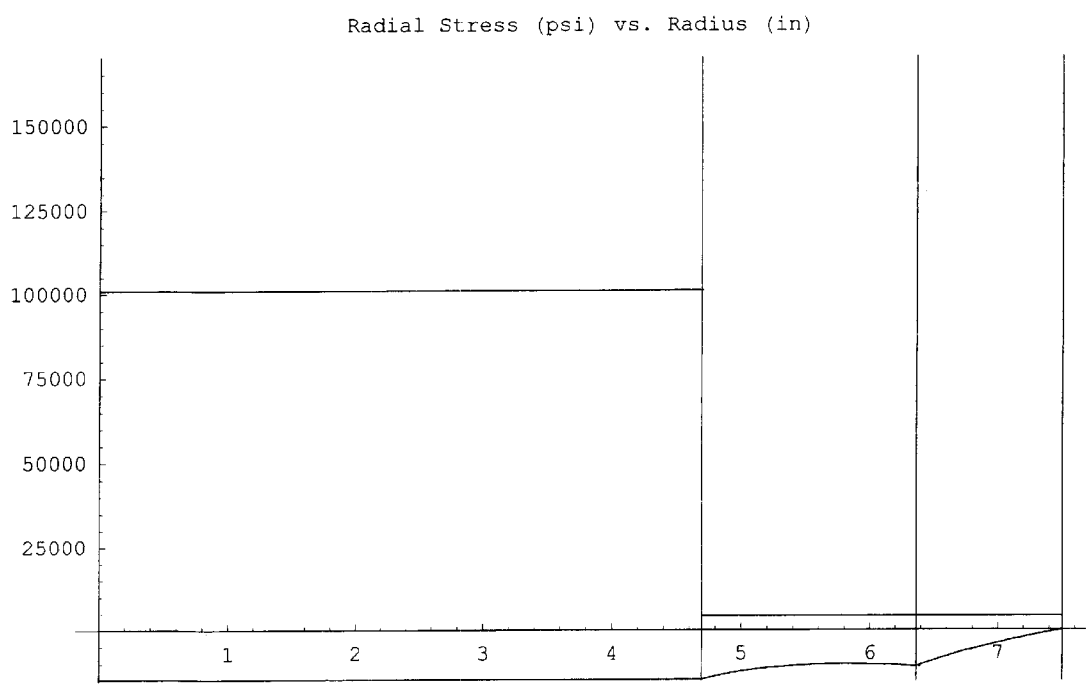
FIGS. 11 and 12 are radial and hoop stress plots of a value-optimized flywheel in accordance with this invention, while at rest, having only two standard modulus carbon fiber/epoxy rings press fit onto a solid steel hub.
Figure 12:
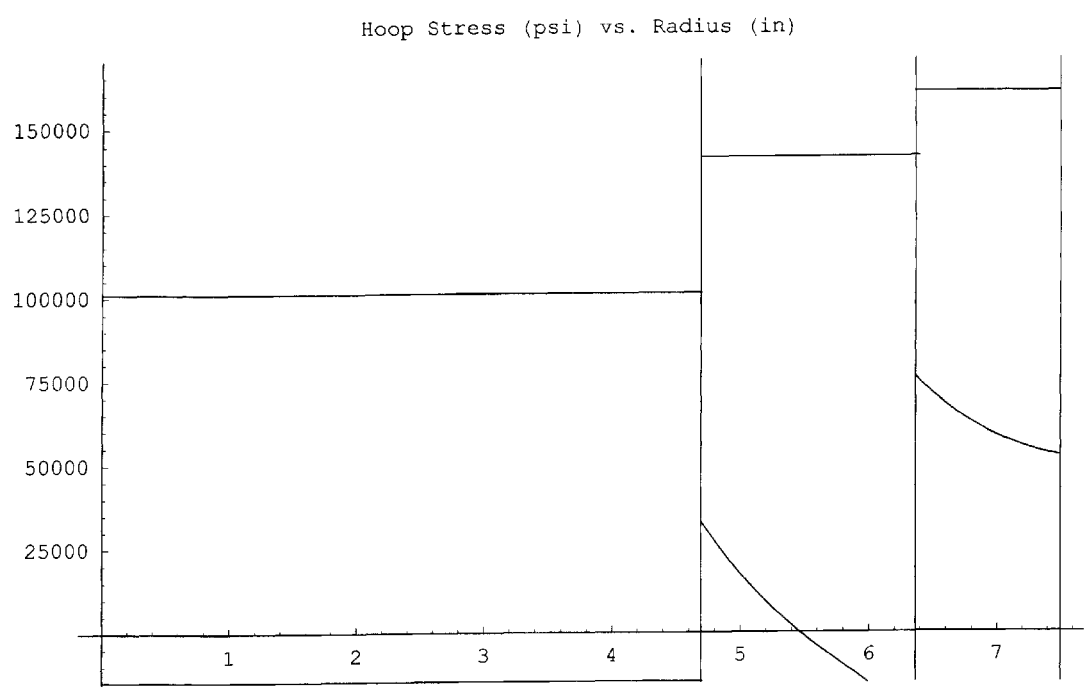
Figure 13:
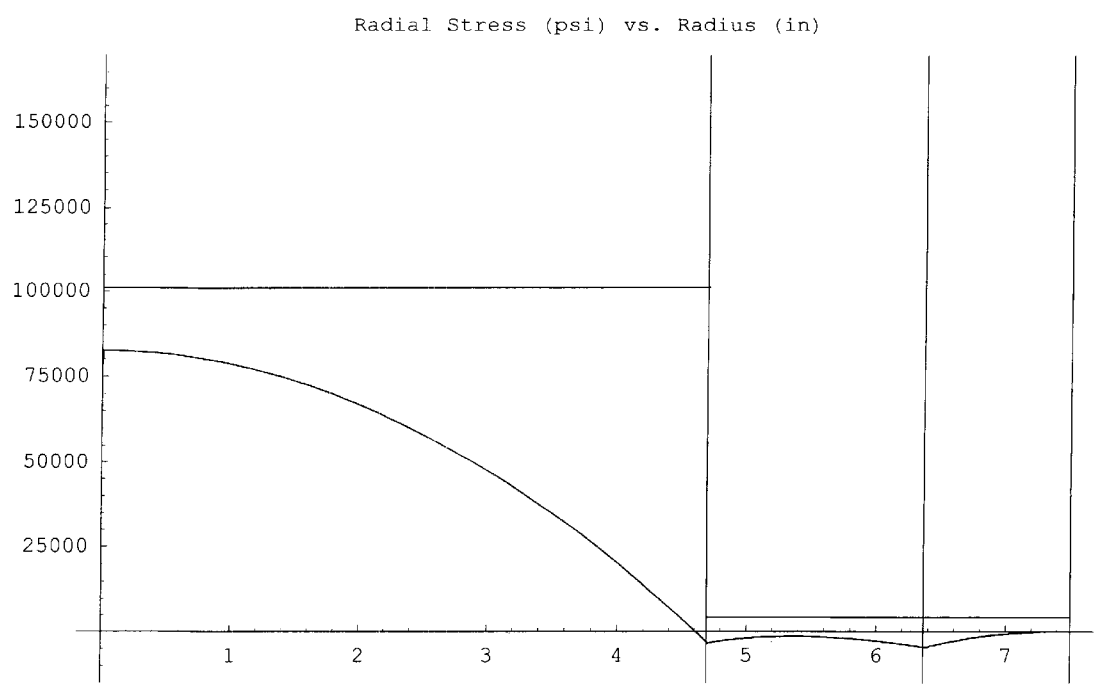
FIGS. 13 ad 14 are radial and hoop stress plots, respectively, of the flywheel depicted in FIGS. 11 and 12 while operating at 35 krpm.
Figure 14:
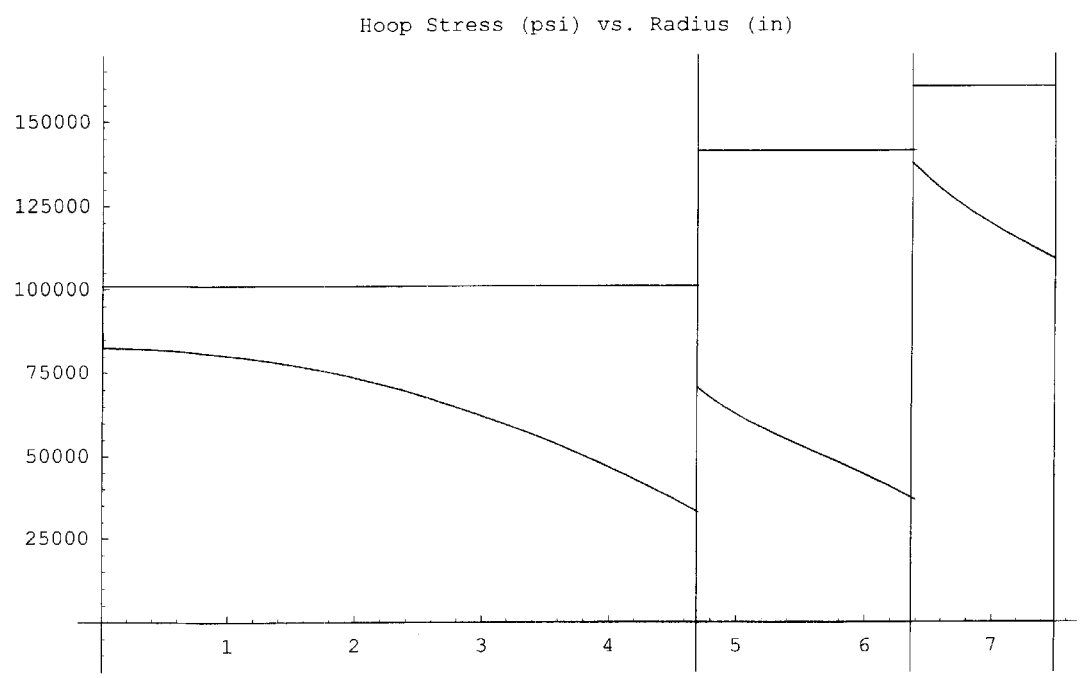
Figure 15:
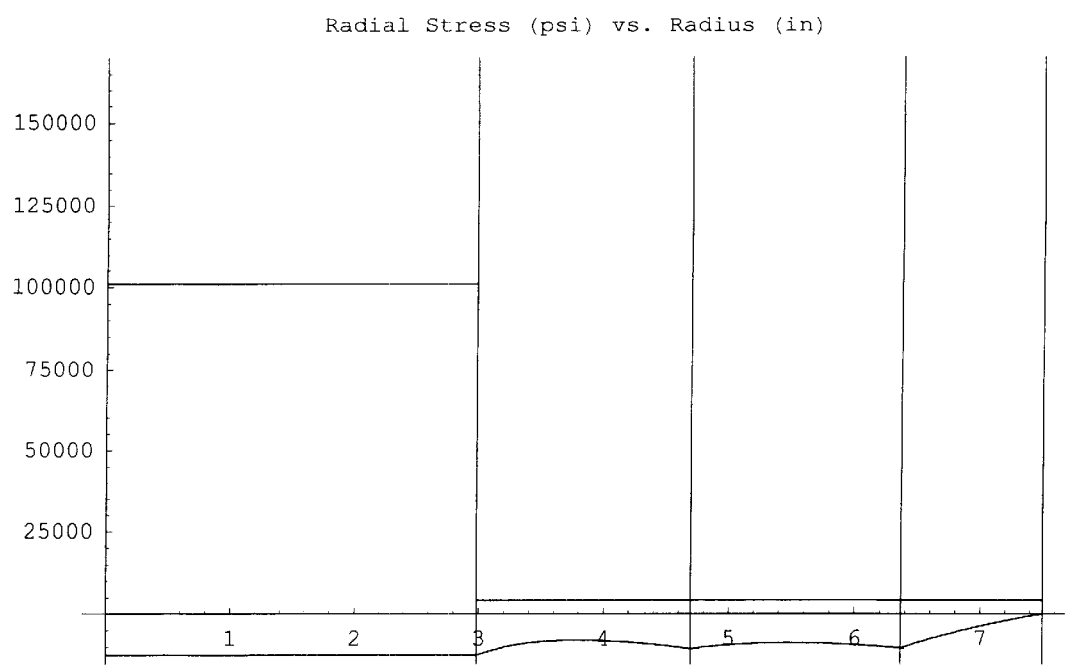
FIGS. 15 and 16 are radial and hoop stress plots of a flywheel constructed of three press-fit standard modulus carbon fiber/epoxy rings on a solid steel hub, while at rest.
Figure 16:
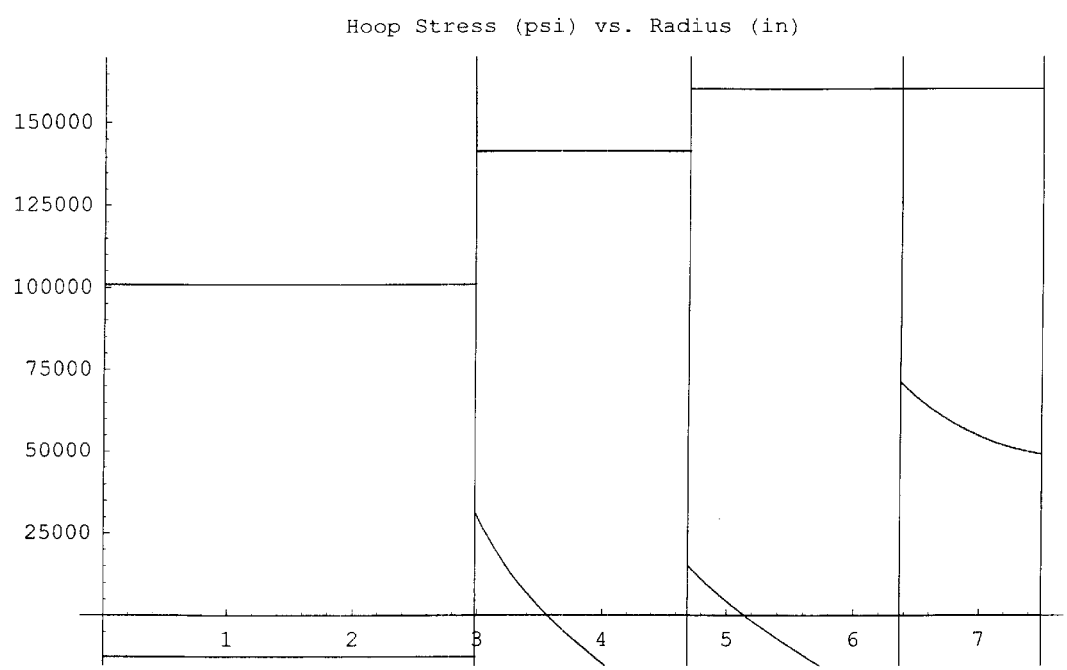

Turning now to the drawings, wherein like reference characters designate identical or corresponding parts, and more particularly to FIGS. 1–3 thereof, a value-optimized high-speed flywheel 25 in accordance with this invention is shown having a high-strength steel hub 30 and a flywheel rim 31 made of two filament wound rings 32 and 33 made of standard modulus carbon fiber-epoxy. The rings 32 and 33 are shown in FIG. 1 partially assembled and ready for telescopically press-fitting axially together to the fully assembled configuration ,shown in FIG. 2, in which the axial ends of both rings and the hub 30 are flush.

The hub 30 has an axially tapered cylindrical body 29, and the two rings 32 and 34 are also axially tapered. The taper angle of the hub matches the taper angle on the inner surface of the inner composite ring 32. The outer surface of the inner composite ring 32 is also tapered axially with an angle matching the taper on the inner surface of the outer composite ring33. The mating radial surface dimensions of the hub 30 and composite rings 32 and 34 are chosen to give significant radial interferences such that, when assembled as shown in FIG. 2, the composite rim rings 32 and 34 stay in radial compression and in compression with the hub at operating speed of the flywheel. The initial radial interference between each ring and also between the inner ring and hub produces pressures usually greater than 5 ksi and preferably as much as 15 ksi when the flywheel is at rest, that is, not rotating, to allow a sufficiently high maximum speed capability of the flywheel. For hoop wound composite rings, the maximum initial possible radial interferences are those producing pressures typically between 15–20 ksi before damage and cracking of the rings occur during assembly. A small amount of helical direction fibers can be included in the hoop wound rings to increase the maximum possible radial interference pressures.

The taper angles are preferably between 0.5° and 2° so as to limit the difference in radial thicknesses of individual rings, and hence interference pressures, between one end of the rotor and the other. An equally important contrary goal is to allowing the rings to initially slide together preferably as much as 80–90%. Angles too low result in less initial overlap and can cause ring failure during assembly due to development of high shear stresses. Epoxy resin is applied to the faying surfaces 34 prior to assembly to reduce the coefficient of friction of the surface and hence the assembly force required to complete the assembly. Depending on the size of the rotor, forces greater than 300,000 lbs can be required to force the rings and hub together. The epoxy in the interface between the rings and the hub is also used as a bonding agent to keep the rings assembled once the epoxy is cured and the axially telescoped assembly is removed from the assembly press. The rings can be pushed together first and then pressed together with the hub or the inner ring and hub can be assembled first. When using high initial interference pressures, it is sometimes desirable to press the hub inside the inner ring first to prevent radial buckling of the inner ring when pressed inside the outer ring.

The hub has a pair of stub shafts 31 projecting axially along an axis of rotation 35 for journaling the hub for high-speed rotation within a vacuum chamber and ballistic container 51. Bearings, such as upper and lower magnetic bearings 53 and 54 support the flywheel in the vacuum chamber 51 for high-speed rotation, as is well known in the flywheel industry. An electric motor/alternator 55 is coupled to the hub for initially driving the flywheel up to speed, and then recovering the energy stored in the flywheel as rotational inertia, by converting it back to electrical energy in the alternator. A separate motor and generator may also be used, as is known in the art.

The hub must be solid and free of an axial center through hole because otherwise the localized stresses in the hub become excessively high during rotation. For instance, even the addition of a pinhole in the axial center of the rotor causes the hoop direction hub stresses to double. Another added benefit of the design is that, because the hub is made from steel, such as high-strength 4340 steel, it could also potentially function as part of a magnetic bearing used to support the flywheel. Attachment of the shafts 31 to the hub body 29 is optimally done by making them integral, out of a single piece of metal. Attaching the shaft by bonding or bolting it on to each end of the hub would result in lower performance and increased tolerances in the run out and alignment between the rotor and shafts. Preferably, the total rotor is assembled with all taper angles aligned in the same direction and such that the small diameters are at the top of the rotor if it spins about the vertical axis. This prevents the rotor from falling apart if it is spun to separation speed. With the small diameters on the bottom of the rotor, rings could potentially fall off the hub if the rotor were spun fast enough to cause the rings to expand radially and separate from each other or from the hub body 29. As shown in FIG. 2, the axial faces of the flywheel rings and hub in the fully assembled flywheel are preferably flush to prevent stress concentrations and high shear stresses in the composite material, which could occur if the composite rings were significantly longer than the steel hub.

FIGS. 3–18 show the radial and hoop stress distributions in several flywheel designs intended to operate at 35 krpm. The design uses a maximum stress allowable of 50% of the ultimate tensile strength of each material. The horizontal line above each plot represents the maximum respective stress allowable for each material in the radial and hoop direction. The stress distributions of the several designs are depicted at rest (0 rpm) and at the designed operating speed (35 krpm). The design types include: E-glass/carbon fiber, steel, steel/carbon fiber, steel/carbon fiber/carbon fiber and steel/carbon fiber/carbon fiber/carbon fiber. All designs operate in radial compression in the composite material section when at maximum speed.

Figure 2A:
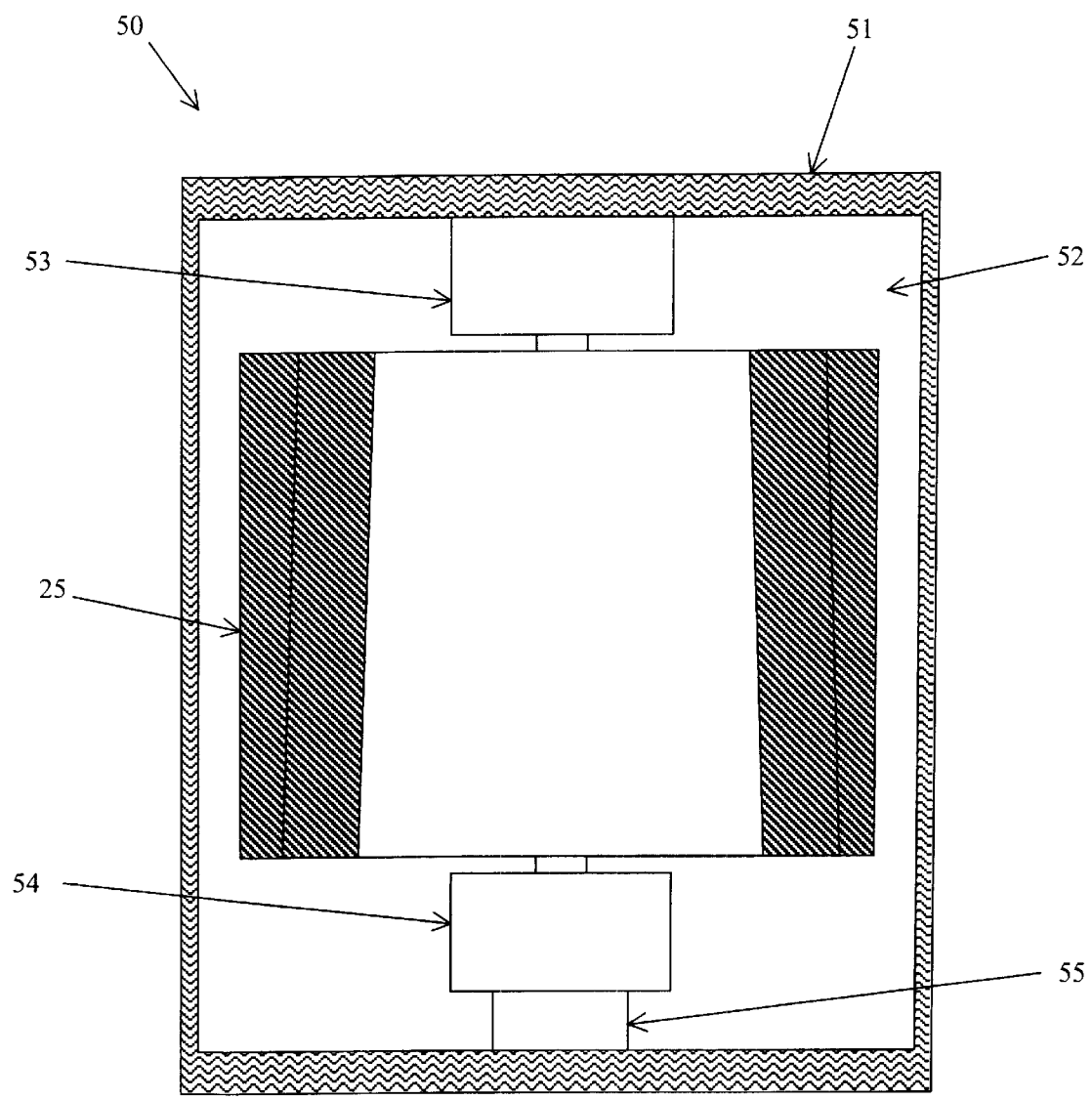
FIG. 2A is a schematic drawing of a flywheel energy storage system having a composite flywheel in accordance with the invention.
Figure 17:
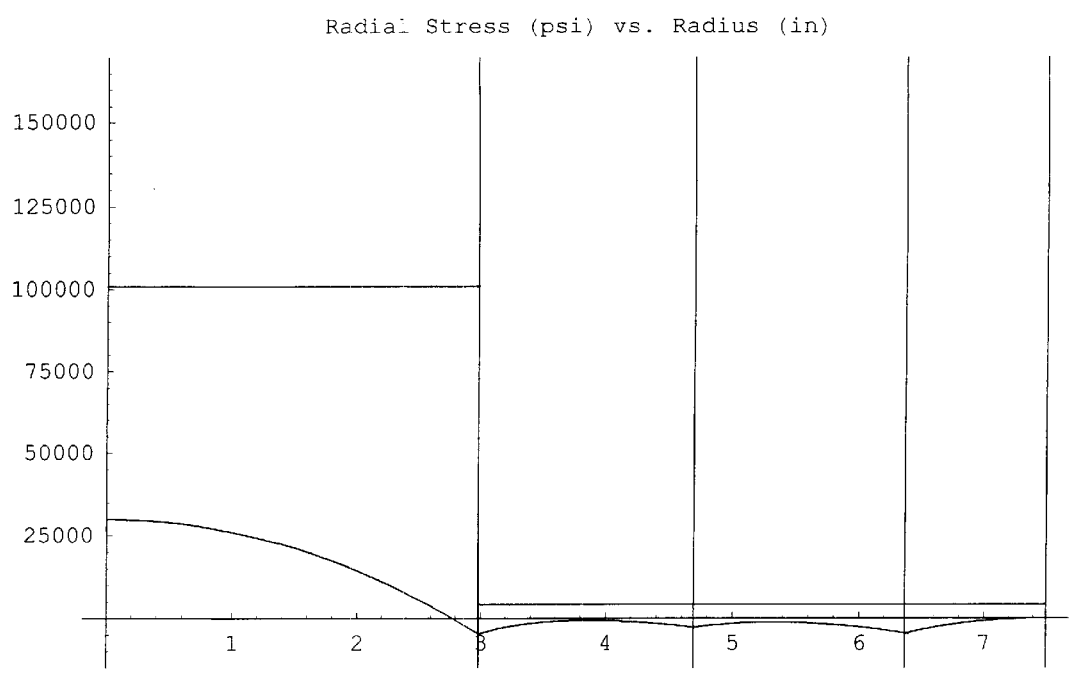
FIGS. 17 and 18 are radial and hoop stress plot f the depicted in FIGS. 15 and 16 while operating at 35 krpm.
Figure 18:
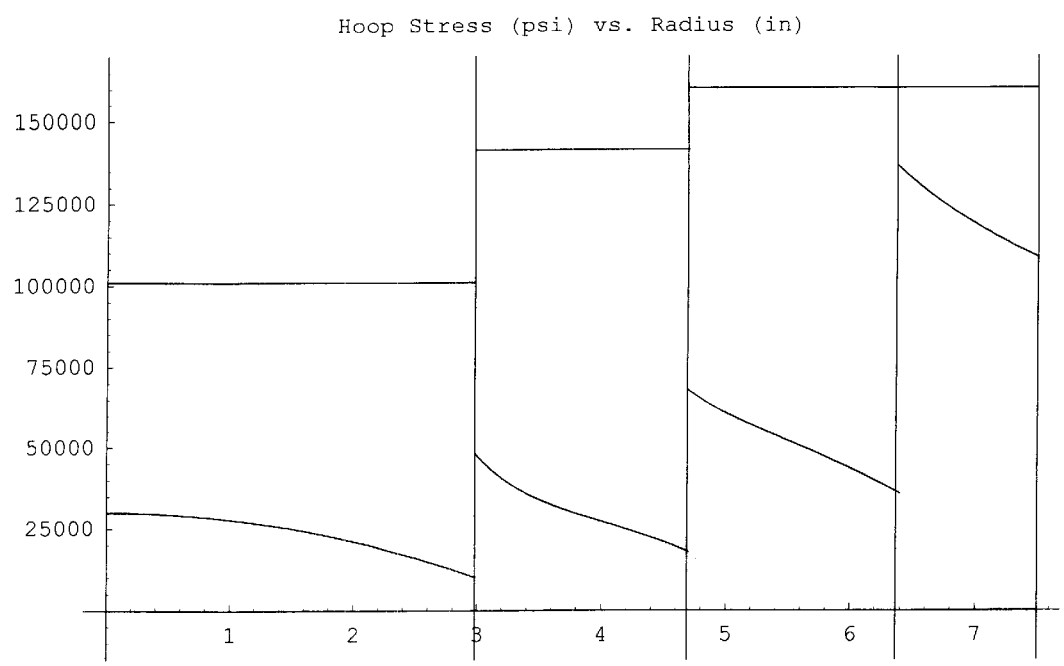

Stress plots, shown in FIGS. 11–14 for a value-optimized flywheel in accordance with the invention, having a steel hub and a two-ring carbon fiber press-fit rim as shown in FIGS. 2 and 2A, show that the hoop strength capabilities of each ring and the hub are significantly utilized at high speed. In FIGS. 17 and 18, Stress plots of a three-ring design, shown at high speed in FIGS. 17 and 18 illustrate that the hoop strength capability is being adequately utilized only in the outer ring and the rest of the flywheel is understressed. Therefore, this more expensive design less efficiently utilizes the material and its use of some of carbon fiber/epoxy instead of the denser hub steel actually reduces the inertia and stored energy.

In a preferred embodiment of the invention, the rim is composed of a two ring press-fit in which the outer ring is preferably radially thinner than the inner rim. The outer rim is made radially thinner so that it stays in radially compression throughout its thickness at maximum speed. If the outer rim were made thicker, it would transition to radial tension when spun to high speed. The outer ring also maintains compression on the inner ring, thereby allowing the inner, ring to be thicker than if the outer ring were not added.

Figure 19:
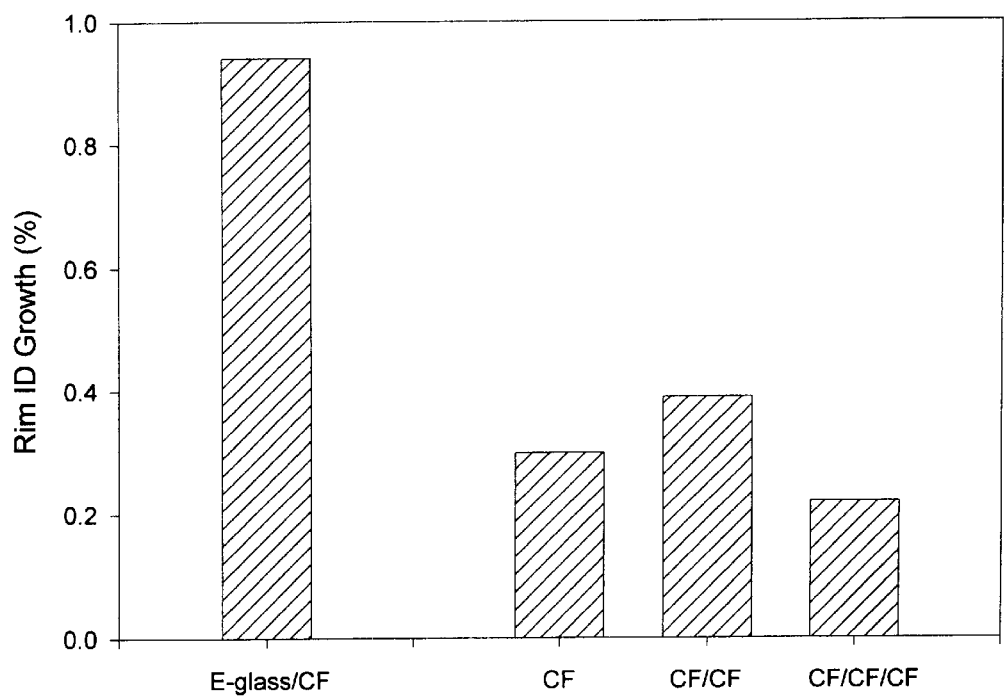
FIG. 19 is a chart comparing the composite rim ID growth of the several flywheel designs depicted in FIGS. 3–18 above.

A comparison of the inner diameter growth of the composite rims (if isolated from the hub) shown in FIG. 19 for each flywheel design illustrates an advantage of the invention. A conventional high performance industrial flywheel utilizing E-glass and standard modulus carbon fiber for self generated radial compression as shown has an ID growth of roughly 0.94% at operating speed. The steel/carbon fiber/carbon fiber press-fit design however has an ID growth 2.4 times smaller at only 0.39%. This simplifies the design requirements of the hub, allowing for use of a solid steel flywheel for the hub.

Figure 20:
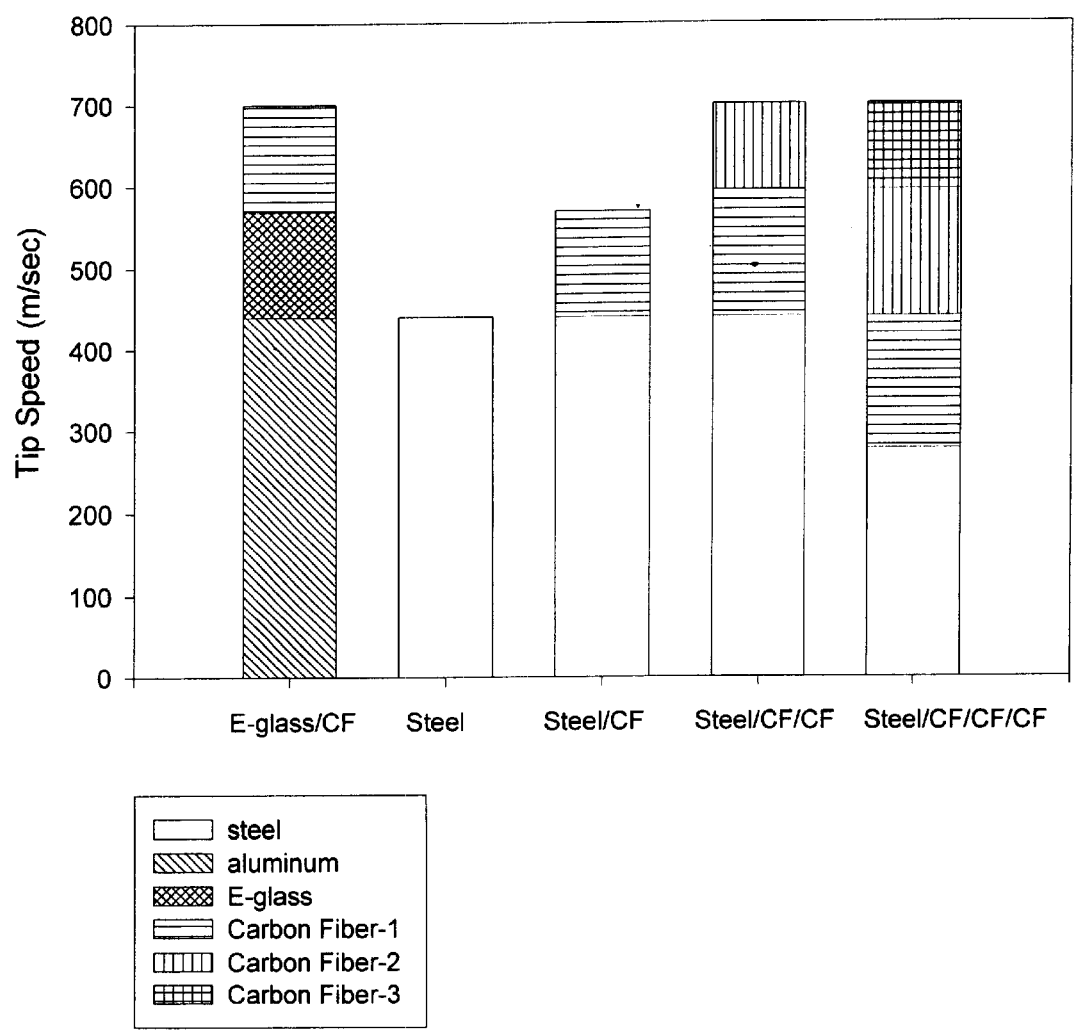
FIG. 20 is a chart comparing the tip speeds of the several flywheel designs depicted in FIGS. 3–18 above.
Figure 21:
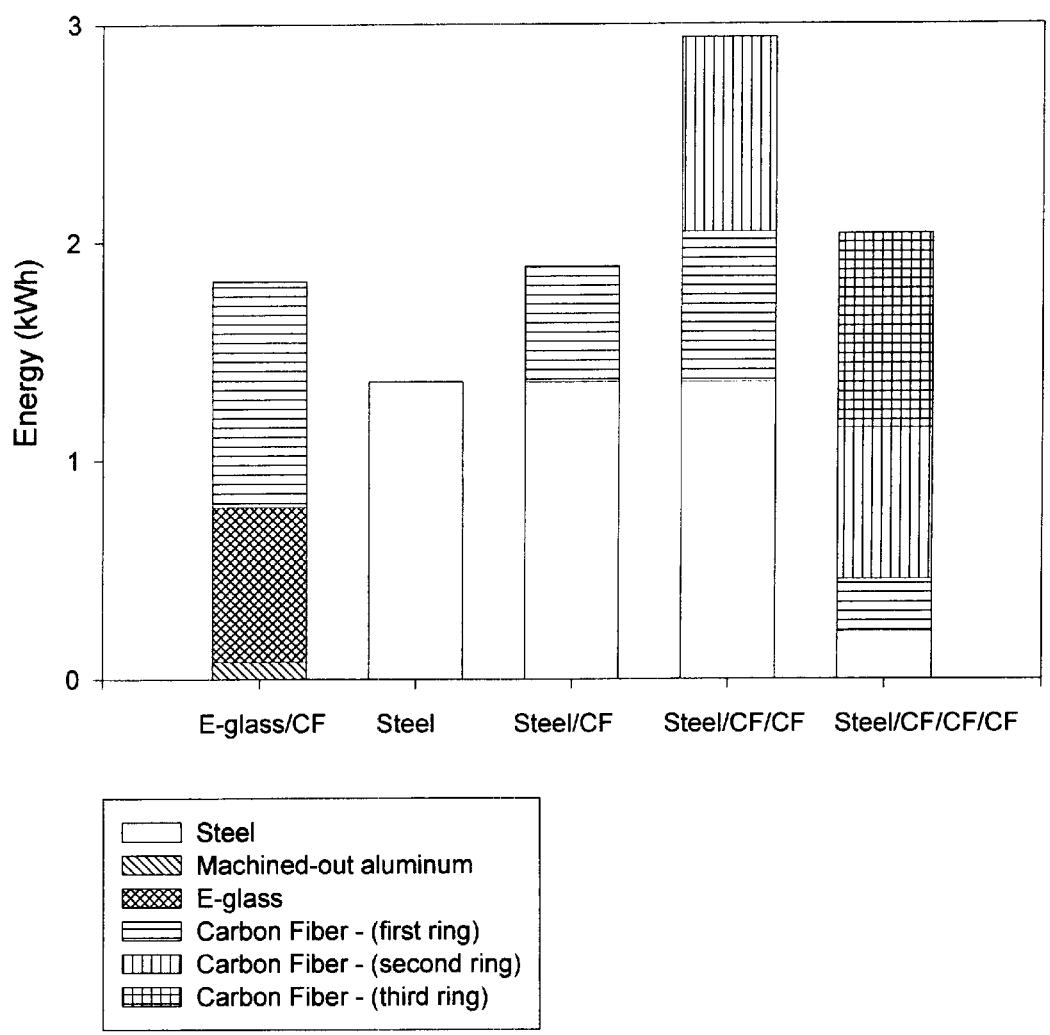
FIG. 21 is a chart showing the stored energy of the flywheel designs depicted in FIGS. 3–18 above.

FIG. 20 shows the maximum safe operating tip speeds at which the different flywheel designs are capable of operating. The E-glass/carbon fiber rim as well as the steel/carbon fiber/carbon fiber and steel/carbon fiber/carbon fiber/carbon fiber designs all have operating speeds of approximately 700 m/sec. Both the steel and the steel/carbon fiber designs fall short due to limitations on the stress in the steel known for use in a flywheel. This indicates that more than one carbon fiber ring is needed with the steel hub to obtain maximum performance. FIG. 21 shows the enery stored in several types of flywheels, each having the largest diameter it can carry and still operate with an appropriate safety margin. The graph illustrates the overall superiority of the value-optimized flywheel invention. From the graph, it can be seen that the energy stored in the steel/carbon fiber/carbon fiber flywheel far exceeds that of all the other designs. For the same operating speed and rotor length, the new design stores 70% more energy than the conventional high performance industrial E-glass/carbon fiber design and 216% more energy than the low performance industrial steel flywheel design. This added energy storage of the invention allows reduction of the overall cost per energy storage of the flywheel.

To date, testing of a 2.7 kWh flywheel in accordance with the invention showed no failure or delaminations when spun to 40,000 rpm with a tip speed in excess of 700 m/sec. An important observation made during the testing was the extremely stable dynamic performance of the flywheel. The low runout during spin testing is attributed to the higher flexural resonance as a result of the solid hub and large rim to hub connection area. The cost of the flywheel is significantly lower than conventional designs with the same performance.

Whether or not the flywheel is constructed of multiple press-fit rings or of a single multiple material ring, the transverse (radial) strength is still of critical importance for the flywheel to achieve high speed. Flywheels are highly unusual composite structures. In almost no other application are composites fabricated and expected to function with thickness up to 5 inches thick. Typical composite structures are considered thick when they are only ¼ inch thick. The other aspect of composite flywheels that makes them very unusual is that they are subjected to transverse loading, that is, loading applied in directions other than the fiber direction. If the flywheel is constructed of press-fit rings that are initially driven into radial compression from interference assembly, the rings are subjected to high shear loading and axial loading during the assembly. High transverse strength is needed to prevent cracking. If the flywheel is a single thick ring constructed of multiple fibers, the flywheel can still have radial tensile stresses over the operating life when creep and fatigue of the different materials occurs. Also, the differences in elastic moduli, cure shrinkage and coefficients of thermal expansion can cause significant residual stresses in the ring. A high transverse strength in the composite is needed to prevent cracking.

FIG. 22 shows the different types of epoxy curing agents and their cured resin properties. Although other types of resins besides epoxies could be used to fabricate composite flywheels, epoxies are preferred because the offer the highest performance per cost. Cyanate ester resins have been used for flywheels because they offer high temperature capability, high toughness and low outgassing, but they are not a good choice for commercial flywheels because they cost roughly thirty times more than epoxies per pound. Vinyl esters and polyesters are low in cost but they result in much higher cure shrinkage and hence unacceptable built-in residual stresses in thick composite flywheels along with lower toughness.

A flywheel resin system for use in manufacturing a flywheel in accordance with this invention preferably has a unique combination of properties that enable it to match the requirements specific to flywheel processing, loading and environment. In order to allow for low cost processing with high quality, particularly, the avoidance of voids in the composite rim rings, the resin system (resin plus curing agent) must have low viscosity. Low viscosity facilitates fabrication of higher strength parts because void content is minimized. Likewise, lower viscosity also allows for lower cost fabrication because fibers can be wound onto the flywheel at higher speed without breaking fibers. For high speed filament winding, a viscosity of the mixed resin and curing agent is preferably below 1000 centipoise at room temperature. The preferred epoxy resin is a difunctional epoxy, of which Bisphenol A epoxy is preferred in particular because of the combination of good properties and low cost. Difunctional epoxies are ⅓ or less in price than trifunctional epoxies and have a lower modulus, superior toughness, which helps in the operation of thick flywheels. Bisphenol F epoxies are also more expensive. The lowest viscosity Bisphenol A epoxies are roughly 5000 cps. Therefore, the curing agent must have significantly lower viscosity to achieve a final system viscosity of 1000 cps or less. The mechanical properties of epoxies are mostly controlled by the curing agent that is mixed with the epoxy. As generally known, the mixture of curing agent to resin should be at or close to the stoichiometric ratio for development of full crosslinking and best mechanical properties, so a low viscosity of the resin mixture cannot be achieved by adding excess curing agent. From the table, it is clear that polyamides and Imidazoles can be ruled out as candidates for flywheel manufacturing due to the high viscosity.

To achieve a high transverse composite strength, the flywheel resin system must have a high elongation and high toughness. The high toughness allows for sustained and repeated spinning to high speed without cracking. It is generally well known that the tougher the resin system, the higher the transverse strength that can be achieved. This is why very tough thermoplastic matrix composites with matrices such as PEEK can achieve a very high transverse strength of roughly 10,000 PSI. Thermoplastic matrix composites manufacturing is slow and the materials are expensive so they are not a realistic choice for composite flywheels. From the criterion of providing high radial tensile strength, anhydrides can be eliminated from consideration as a material for composite flywheels because they have low elongation and are brittle. Cycloaliphatic amines and aromatic amines are marginally acceptable for flywheel fabrication and are not preferred because they also have low toughness.

For highest speed capability of the flywheels and maximum utilization of the radial strength of the composite, it is desirable to fabricate the flywheel with low residual manufacturing stresses. Epoxies in general shrink roughly 2–3% from the action of crosslinking alone. Additional shrinkage also occurs from the coefficient of thermal expansion as the resin cools from the curing temperature. It is preferable that the resin system can cure in short time at temperatures under 100° C.

One of the most important properties of resin system used in flywheels is the elevated operating temperature capability. According to the flywheel specification by Telcordia, GR-2957-CORE, "Generic Requirements for Below Ground Flywheel Energy Storage Systems," the flywheel must be capable of exposure to temperatures only high as 46° C. (115° F.). This initially appears to be a requirement that could be satisfied easily by all of the curing agent types. However, in practice it is not as easy as it initially appears. The internal components of the flywheel system contain heat-generating elements that include the motor/generator and also the magnetic bearings. The heat generated from these elements can increase the temperature inside a sealed, evacuated flywheel containment vessel by as much as 15° C., raising the internal temperature from a.possible ambient temperature of 46° C. to about 61° C. (142° F.). Almost all of the curing agent candidates except amidoamines and polyamides would appear to be acceptable for use with epoxies in flywheel applications, based on the glass transition temperatures of the cured resins. However, the structural properties of epoxy resins drop before reaching the glass transition temperature. The conventional operating temperature margin for epoxy matrix composites is about 25° C. (45° F.) below the glass transition temperature. That is, the convention is to design applications for epoxy matrix composite structures to operate at temperatures no higher than 25° C. (45° F.) below the glass transition temperature. For trifunctional and tetrafunctional epoxies, the upper operating temperature can be a little closer to the glass transition temperature due to a higher crosslink density. However, as described below, epoxy matrix composites are more temperature sensitive in certain applications than is commonly believed. At temperatures well below the conventional operating temperature margin, they are subject to substantial plastic strain when subjected to continuous load over extended time periods. This type of plastic strain is known as "creep".

Figure 23:
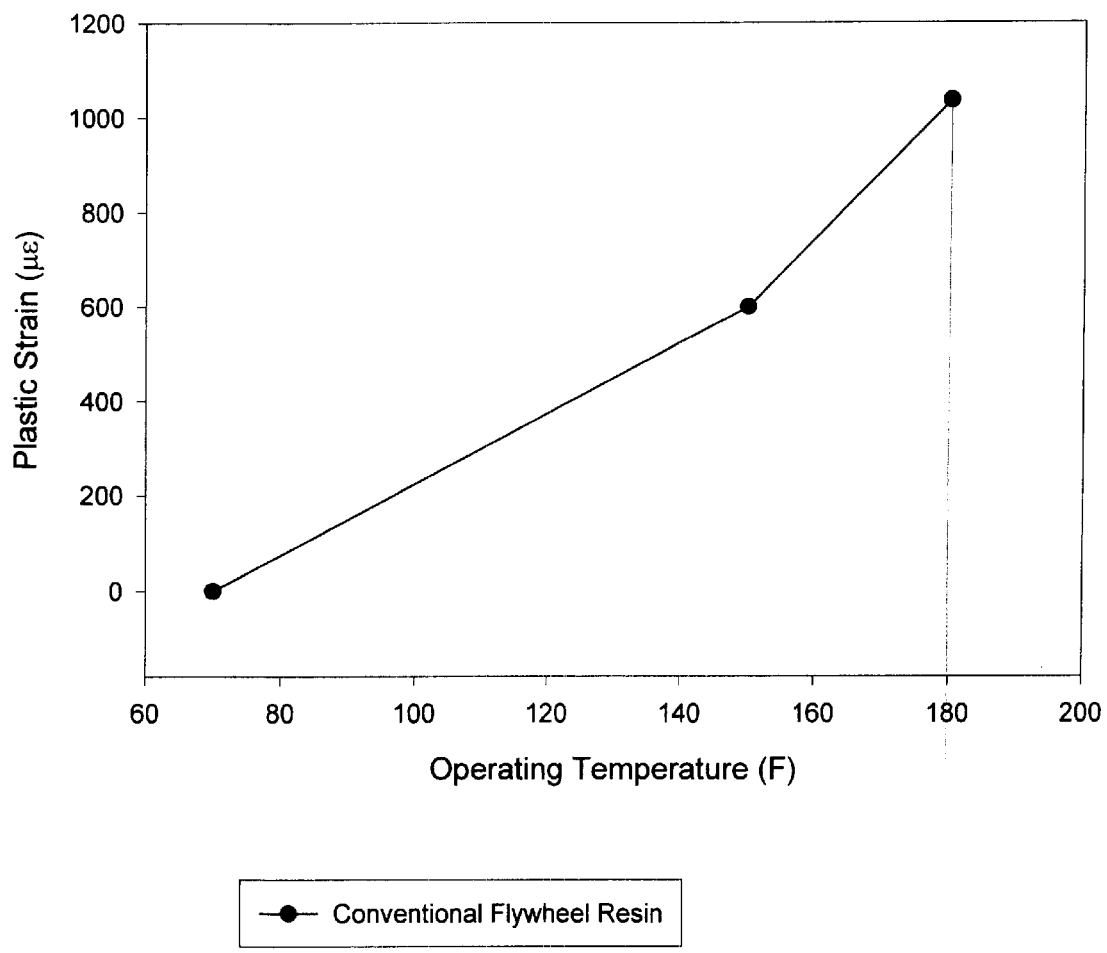
FIG. 23 is a graph showing the inner diameter plastic strain of carbon fiber/epoxy rings with conventional flywheel epoxy vs. operating temperature.

The plastic strain, or creep, of a state-of-the-art carbon fiber/epoxy composite structure with an aliphatic amine cured Bisphenol A epoxy resin experienced under load for four hours over a range of temperatures is shown in the graph of FIG. 23. The epoxy had a glass transition temperature of roughly 90° C. (194° F.). The data was generated through an actual test designed to simulates the unique transverse (radial) loading that is applied to composites used in flywheels. The radial loading simulated in the test corresponds to the result of interference assembled rings, interference generating designs or the typical case of a hub being interference assembled with the flywheel. Such radial compressive load is generated in press-fit flywheel of the invention, and during operation of the flywheel due to centrifugal force. Solid steel discs of 5.510 inch diameter were cooled in liquid nitrogen and inserted into the inner bores of composite rings with 5.500 inch inner diameter and 1 inch thickness. The interference assemblies were then warmed to room temperature and some were subsequently heated to different temperatures and held there for a period of 4 hours. The steel cylinders were then cooled with liquid nitrogen and removed. The inner diameter of each ring was then measured again at room temperature to determine the creep or plastic deformation of the rings. From the graph, it is clear that significant radial deformation occurs at temperatures well below the operating temperature margin of 25° C. below the glass transition temperature, which would be 65° C. (149° F.). The exposure to the elevated temperature and internal pressure was for only a relatively short time of 4 hours, so additional creep could be anticipated for longer periods at those temperatures, under those loads. Because of the unique requirement of transverse loading on the composite, the temperature capability of the resin must be much higher than in normal composite structures that are only significantly loaded in the longitudinal (fiber) direction. From the results of this test, the glass transition temperature for a flywheel resin system is preferably around at least 105° C. (221° F.). No resin curing agents currently available satisfy all of these requirements.

To date, the only published flywheel resin systems have been Bisphenol A epoxies cured with either aromatic amines or ether amines. Aromatic amines are not preferred because they have less than desired toughness and they require high temperatures for gelation. Their use is also becoming more regulated and restricted. However, it should be noted that they have been used for fabrication of many flywheels to date. The gel time for epoxies roughly doubles for every 10° C. reduction in temperature. Accelerators can be added to aromatic amines to reduce the cure temperatures, however a large amount is required to get the temperature below 100° C. in acceptable time. Such large amounts of accelerators would significantly reduce the strength and toughness, which is already less than desirable for maximum flywheel speed. Ether amine cured epoxies have good low temperature curing and good toughness. However, in light of the elevated temperature flywheel radial plastic deformation tests noted above, the glass transition temperatures are unacceptably too low.

Based on the foregoing considerations, I believe a resin system for composite flywheels should have all or most of the following properties: low mixed viscosity of approximately 1000 cps or less at 25° C., high toughness, high elongation, a glass transition temperature of roughly approximately 105° C. (221° F.) or greater, gelation temperature below 100° C. and low cost. Accordingly, the following preferred embodiment of a resin mixture in accordance with this invention was developed to provide these properties. It includes an epoxy and a mixture of two curing agents. The epoxy is preferably either all or a majority of Bisphenol A epoxy for low cost, however Bisphenol F epoxy could also be used with the advantage of lower viscosity but at the expense of approximately 35% higher cost. The preferred curing agent to achieve the desired properties is a mixture including at least two curing agents. The first curing agent in the mixture should be between about 20%–70% cycloaliphatic amine, such as PACM-20 which is also called bis(p-aminocyclohexyl) methane. The second curing agent in the mixture is primarily comprised of either an ether amine (such as polyoxypropylenetriamine) or an aliphatic amine (such as triethylene tetramine), or a mixture of both. The result of the mixture is a blending of properties such as elevated temperature capability, toughness and elongation. Because the curing agents in the mixture have low temperature gelation, the flywheel can be cured at low temperature and imparts a low residual stress for higher speed operation. Aromatic amines could not be substituted for the cycloaliphatic amine because those amines would be unlikely to crosslink in the final epoxy. A conventional approach for increasing toughness is to add elastomer or thermoplastic toughener particles to the resin. However, adding toughener particles to a solely cycloaliphatic amine cured resin would be disadvantageous as a flywheel resin becausea sufficient amount of particles to adequately increase the toughness for flywheels would increase the viscosity enough to introduce flywheel manufacturing difficulties. Accordingly with the invention, the combination of cycloalipahtic amine curing agent with a lower temperature, higher toughness curing agent allows production of a high toughness epoxy that has improved elevated temperature capability. As with any material, above a certain level of toughness, increases in toughness do not improve the durability or capability of a structure. The result of the invention is to simultaneously provide adequate toughness and elevated temperature capability simultaneously with a low viscosity and a low cure temperature. Resin systems with temperature capabilities significantly exceeding what is actually really needed are not preferred because they have less than the maximum capable toughness.

Figure 24:
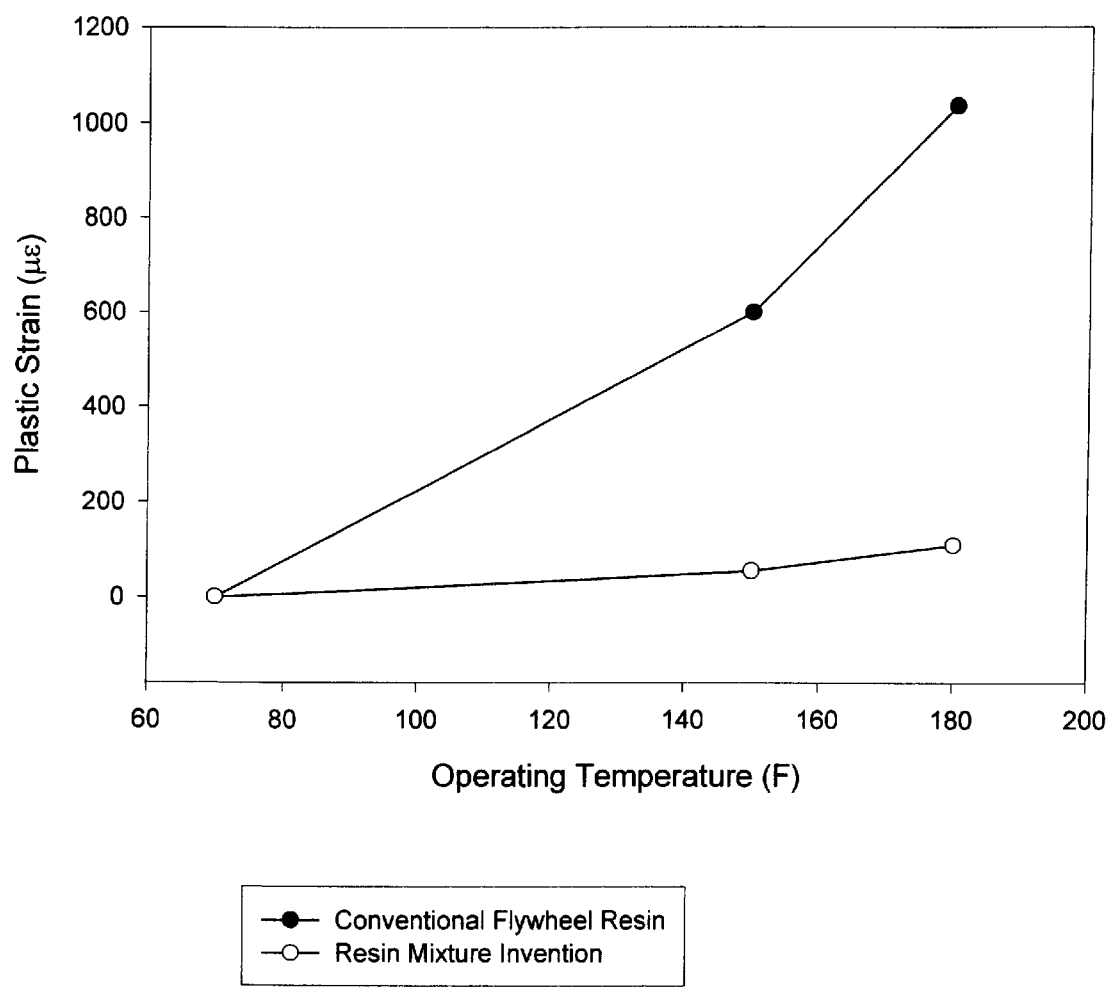
FIG. 24 is a graph showing the inner diameter plastic strain of carbon fiber/epoxy rings with different resin systems vs. operating temperature.

FIG. 24 shows a comparison of inner diameter plastic strain of carbon fiber/epoxy rings with different resin systems vs. operating temperature. The same test as used for FIG. 23 was duplicated using the resin system mixture invention. The resin consisted of a Bisphenol A epoxy resin with a curing agent mixture comprised of 57% aliphatic amine and 43% cycloaliphatic amine by weight. The resin had a glass transition temperature of 111° C. (232° C.). Curing agent mixtures of cycloaliphatic amines with more than one other low-temperature curing agent could also be used but in general mixing more curing agents is typically more complicated and costly. If polyamides or amidoamines were primarily used with the cycloaliphatic amine, the lower glass transition temperature and generally higher viscosity of these curing agents would require use of more of the cycloaliphatic amine, resulting in a more brittle epoxy matrix. The final mixed viscosity would also be higher than the preferred composition. Reactive diluents can be added with the resin to reduce viscosity, but they reduce the thermal capability and toughness, depending on the amount added. Toughener particles can also be added to the resin, but this increases the viscosity, as noted above. Likewise, the Bisphenol A epoxy resin could be mixed with other resins such as Bisphenol F epoxy to modify properties. A composition with Bisphenol F epoxy added offers good properties, but at an increased costs. From FIG. 24, it is clear that the resin system mixture has a superior elevated temperature performance and an overall performance that matches the specific requirements of composite flywheels better than previous flywheel resins. The resin system mixture also shows an approximately 60% increase in K1C fracture toughness over a Bisphenol A epoxy cured with a cycloaliphatic amine alone.

Filament winding can be done with conventional curing or with in-situ curing. Flywheels could be fabricated with other constructions and fabrication methods than filament wound rings, such as resin transfer molding. The resin mixture described would be applicable and useful for all such fabrication methods and designs. Likewise the resin mixture could also be applied to composite hubs used to support other designs of composite flywheel for rotation. The property and processing requirements would be the similar.

Obviously, numerous modifications and variations of the described preferred embodiment are possible and will occur to those skilled in the art in light of this disclosure of the invention.

Accordingly, I intend that these modifications and variations, and the equivalents thereof, be included within the spirit and scope of the invention as defined in the following claims, wherein I claim:

1. A composite material flywheel having a flywheel rim made of a filament-reinforced epoxy made with an epoxy plus a curing agent that is a mixture of at least two curing agents, including a first curing agent including a cycloaliphatic amine curing agent between 20% and 70% of the total curing agent mixture by weight, plus a second curing agent.

2. A composite flywheel as described in claim 1 wherein said epoxy resin includes Bisphenol A epoxy.

3. A composite flywheel n epoxy matrix as described in claim 2 wherein the epoxy resin is difunctional.

4. An epoxy matrix as described in claim 1 wherein the epoxy resin includes Bisphenol F epoxy.

5. A composite flywheel n epoxy matrix as described in claim 1 wherein the curing agent contains an aliphatic amine in composition between 30% and 80% by weight.

6. A composite flywheel as described in claim 5 wherein said aliphatic amine is triethylene tetramine.

7. A composite flywheel n epoxy matrix as described in claim 1 wherein the curing agent contains an ether amine in composition between 30% and 80% by weight.

8. A composite flywheel as described in claim 7 wherein said ether amine is polyoxypropylenetriamine.

9. A composite flywheel as described in claim 1 wherein said second curing agent includes curing agents selected from the group including an aliphatic amine ether amine, said second curing agent constitutes between 30% and 80% by weight of said curing agent mixture.

10. A composite flywheel as described in claim 1 wherein said second curing agent contains an amidoamine in composition between 30% and 80% by weight.

11. A composite material flywheel as described in claim 1 wherein said composite material is produced by filament winding.

12. A composite flywheel as described in claim 1 wherein said cycloaliphatic amine curing agent is bis(p-aminocyclohexyl)methane.

13. A flywheel as defined in claim 1, further comprising:
a solid steel hub onto which said flywheel rim is pressed with a radial interference fit.

14. A flywheel as defined in claim 13, wherein:
said hub has an outer surface that is tapered axially, said composite rim has an inner surface that is axially tapered, both said hub taper and said rim taper having equal taper angles.

15. A flywheel as defined in claim 13, wherein:
said flywheel has a ratio of steel hub mean diameter to flywheel outer diameter that is between 0.50 and 0.70.

16. A flywheel as defined in claim 13, wherein:
during rotation, energy stored as rotational inertia in said steel hub constitutes between 40% and 60% of total energy stored in said flywheel.

17. A flywheel as defined in claim 13, wherein:
said rim has only two rings, an inner ring and an outer ring, pressed together with a radial interference fit;
said rings are each filament wound structures made primarily of standard modulus carbon fiber in an epoxy matrix.

18. A flywheel as defined in claim 17, wherein;
said radial interference between said hub and both of said composite rings creates pressures greater than 5 ksi between said inner and outer rings and between said inner ring and said hub when said flywheel is at rest.

19. A flywheel as defined in claim 17, wherein:
said outer carbon fiber/epoxy ring is radially thinner than said inner ring.

20. A flywheel as defined in claim 17, wherein;
said inner composite ring has an axially tapered outer surface, and said inner ring has an axially tapered inner surface, both said inner ring taper and said outer ring taper having equal taper angles of between 0.5° and 2.0°.

21. A flywheel as defined in claim 17, wherein:
said inner carbon fiber/epoxy ring has a mean outer diameter and said flywheel has a mean outer diameter; wherein the ratio of said mean outer diameters of said inner ring and said flywheel is between 0.80 and 0.90.

22. A method of storing and retrieving electrical energy in and from a flywheel as defined in claim 1, comprising:
storing energy in said flywheel as rotational inertia by energizing an electric motor/generator with electrical power to drive said flywheel supported in bearings in a vacuum enclosure, recovering said stored energy by driving said motor generator with said rotating flywheel to generate electrical power in said motor/generator.

23. A method of storing and retrieving electrical energy in and from a flywheel as defined in claim 22, wherein:
said flywheel includes a solid steel hub and a rim having exactly two composite rings press-fit on said hub with a radial interference fit, said rings each are filament wound structures made primarily of standard modulus carbon fiber in an epoxy matrix.

24. A method of manufacturing an energy storing flywheel as defined in claim 17, comprising:
selecting a piece of steel and machining said piece of steel to produce a unitary solid hub having an axially tapered cylindrical body and an axial stub shaft at each axial end of said body;
selecting exactly two axially tapered cylindrical rings of filament-wound carbon fiber in said epoxy matrix, one of said rings being dimensioned to slide telescopically partially into the other of said rings;

coating the faying surfaces of said rings and said hub with a coating epoxy;

pressing said two rings axially onto each other and onto said hub with an interference fit; and holding said two rings and said hub axially together while said coating epoxy in said faying surfaces sets.

25. A method of making a flywheel as defined in claim 24, wherein:

said rings are filament wound onto a tapered mandrel to give said axial taper.

26. A method of making a flywheel as defined in claim 24, wherein:

said rings are filament wound as elongated cylindrical cylinders onto a cylindrical mandrel and cured on said mandrel; and after curing, said rings are cut from said elongated cylinder and said axial taper is machined into said rings.

27. A method of making a flywheel as defined in claim 24, wherein:

both of said rings are made from only standard modulus carbon fiber and epoxy and said curing agents.

28. A method of making a flywheel as defined in claim 24, wherein:

said epoxy matrix is made of an epoxy and said two curing agents, said epoxy and curing agents when mixed having a low mixed viscosity of no greater than approximately 1000 cps at 25° C., and a gelation temperature below 100° C.;

said epoxy matrix after curing having high toughness, high elongation, and a glass transition temperature of at least approximately 105° C. (221° F.).

* * * * *